(12) United States Patent
Suzuki et al.

(10) Patent No.: US 7,486,254 B2
(45) Date of Patent: Feb. 3, 2009

(54) INFORMATION CREATING METHOD INFORMATION CREATING APPARATUS AND NETWORK INFORMATION PROCESSING SYSTEM

(75) Inventors: Hiroyuki Suzuki, Kanagawa (JP); Satoshi Tabuchi, Ibaraki (JP); Atsuhiko Fujimoto, Saitama (JP); Hideharu Fujiyama, Chiba (JP); Shuji Kurashige, Tokyo (JP); Toru Miyake, Kanagawa (JP); Masaaki Isozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 850 days.

(21) Appl. No.: 10/489,556

(22) PCT Filed: Sep. 13, 2002

(86) PCT No.: PCT/JP02/09401

§ 371 (c)(1),
(2), (4) Date: Oct. 12, 2004

(87) PCT Pub. No.: WO03/026289

PCT Pub. Date: Mar. 27, 2003

(65) Prior Publication Data
US 2005/0052338 A1 Mar. 10, 2005

(30) Foreign Application Priority Data

| Sep. 14, 2001 | (JP) | ............... 2001-278962 |
| Sep. 14, 2001 | (JP) | ............... 2001-278963 |
| Sep. 14, 2001 | (JP) | ............... 2001-278964 |
| Sep. 14, 2001 | (JP) | ............... 2001-278965 |

(51) Int. Cl.
*G09G 5/00* (2006.01)
(52) U.S. Cl. .......... 345/2.1; 348/14.08; 715/201; 715/716; 725/135

(58) Field of Classification Search .......... 345/1.1, 345/2.1; 348/14.08, 14.09; 725/112, 135; 715/200–203, 716, 719–723
See application file for complete search history.

(56) References Cited

U.S. PATENT DOCUMENTS 5,717,869 A    2/1998   Moran et al.

(Continued)

FOREIGN PATENT DOCUMENTS

EP    0 660 249    6/1995

(Continued)

*Primary Examiner*—Richard Hjerpe
*Assistant Examiner*—Tom V Sheng
(74) *Attorney, Agent, or Firm*—Frommer Lawrence & Haug LLP; William S. Frommer; Thomas F. Presson

(57) ABSTRACT

An information creating method comprising the steps of: recording moving picture/audio information obtained from a moving picture/audio input apparatus; recording pieces of still picture information displayed on a plurality of displays connected to a network; and, when pieces of said still picture information are recorded, creating a reproduction management list of said pieces of still picture information that correspond to said moving picture/audio information. It is possible to chronologically grasp from the reproduction management list when and in which file name the information has been displayed on each of the displays and, when contents represented in an HTML format etc. are reproduced, it is possible to easily select a display pattern in which pieces of information are to be reproduced on the same screen, thus displaying pieces of still picture information one and all on a split screen as inserted therein.

44 Claims, 22 Drawing Sheets

U.S. PATENT DOCUMENTS

| | | |
|---|---|---|
| 5,760,767 A | 6/1998 | Shore et al. |
| 5,822,537 A * | 10/1998 | Katseff et al. ............... 709/231 |
| 5,995,146 A | 11/1999 | Rasmussen |
| 6,124,881 A | 9/2000 | Terui et al. |
| 6,249,281 B1 | 6/2001 | Chen et al. |
| 6,741,977 B1 * | 5/2004 | Nagaya et al. ................ 707/1 |
| 7,124,357 B1 * | 10/2006 | Orr ............................ 715/234 |
| 2002/0067405 A1 * | 6/2002 | McDiarmid .............. 348/14.08 |

FOREIGN PATENT DOCUMENTS

| | | |
|---|---|---|
| JP | 4-95450 | 3/1992 |
| JP | 8-293925 | 11/1996 |
| JP | 9-70009 | 3/1997 |
| JP | 9-200350 | 7/1997 |
| JP | 2001-143447 | 5/2001 |
| WO | WO 00 01154 | 1/2000 |

* cited by examiner

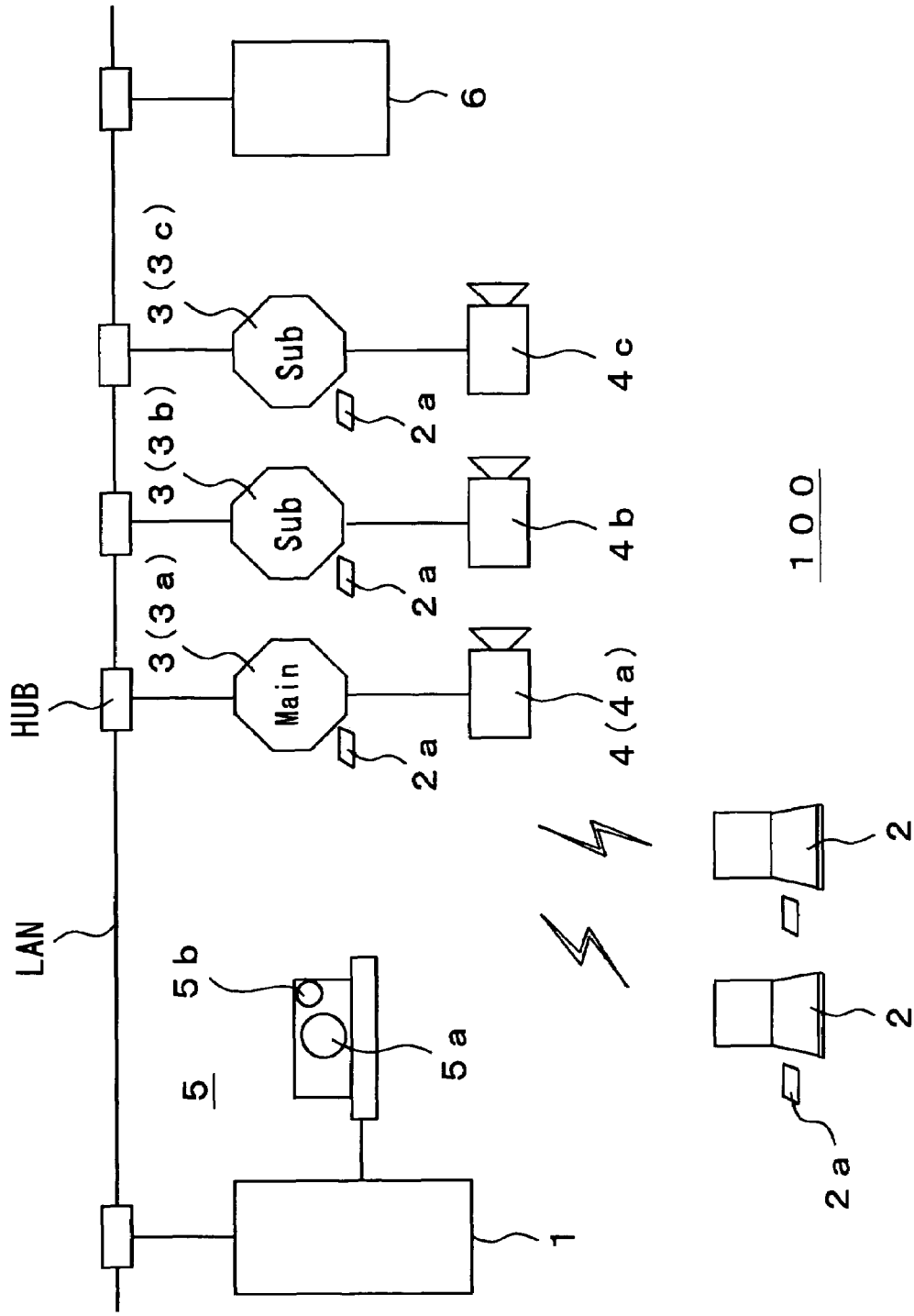

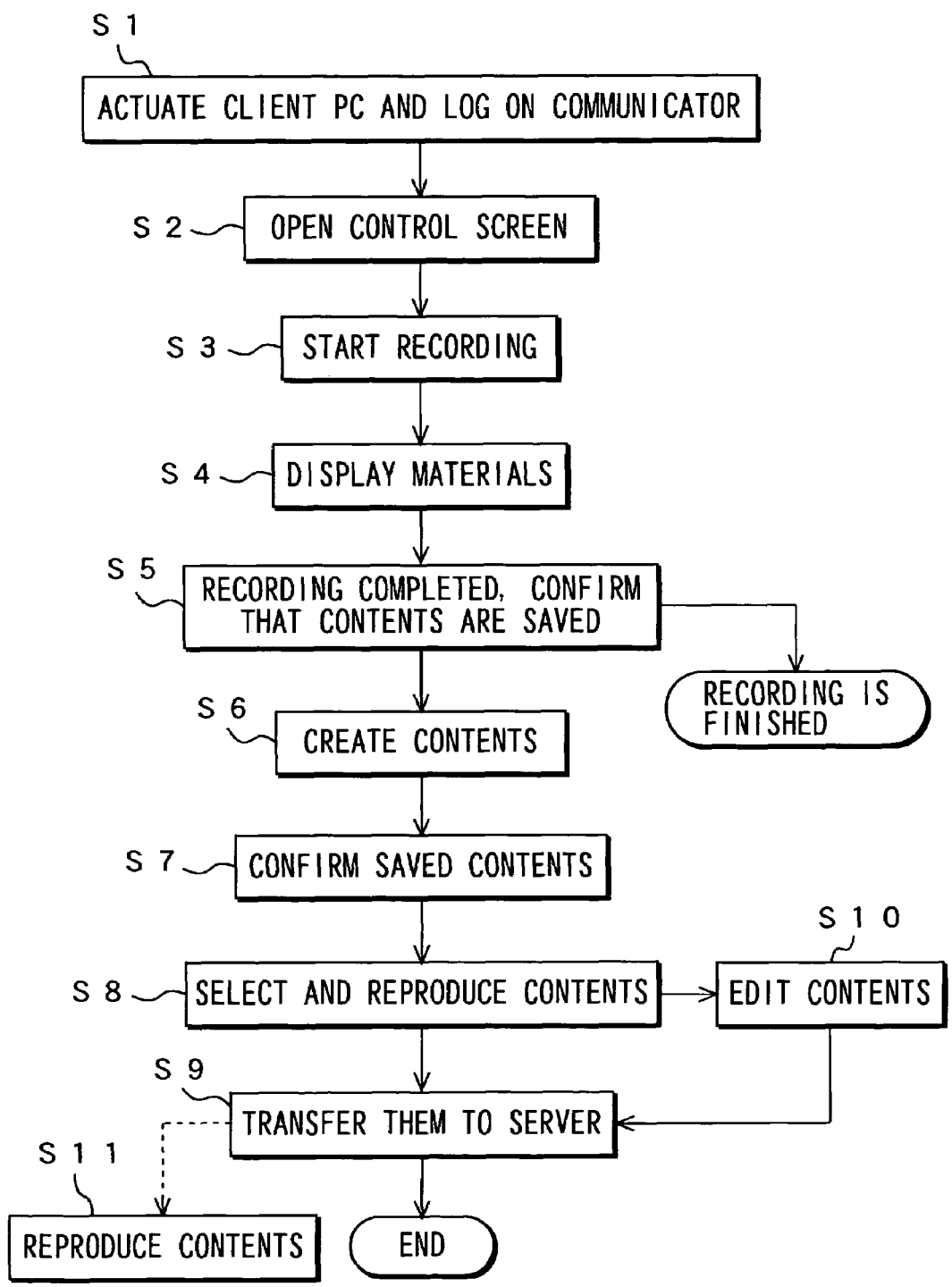

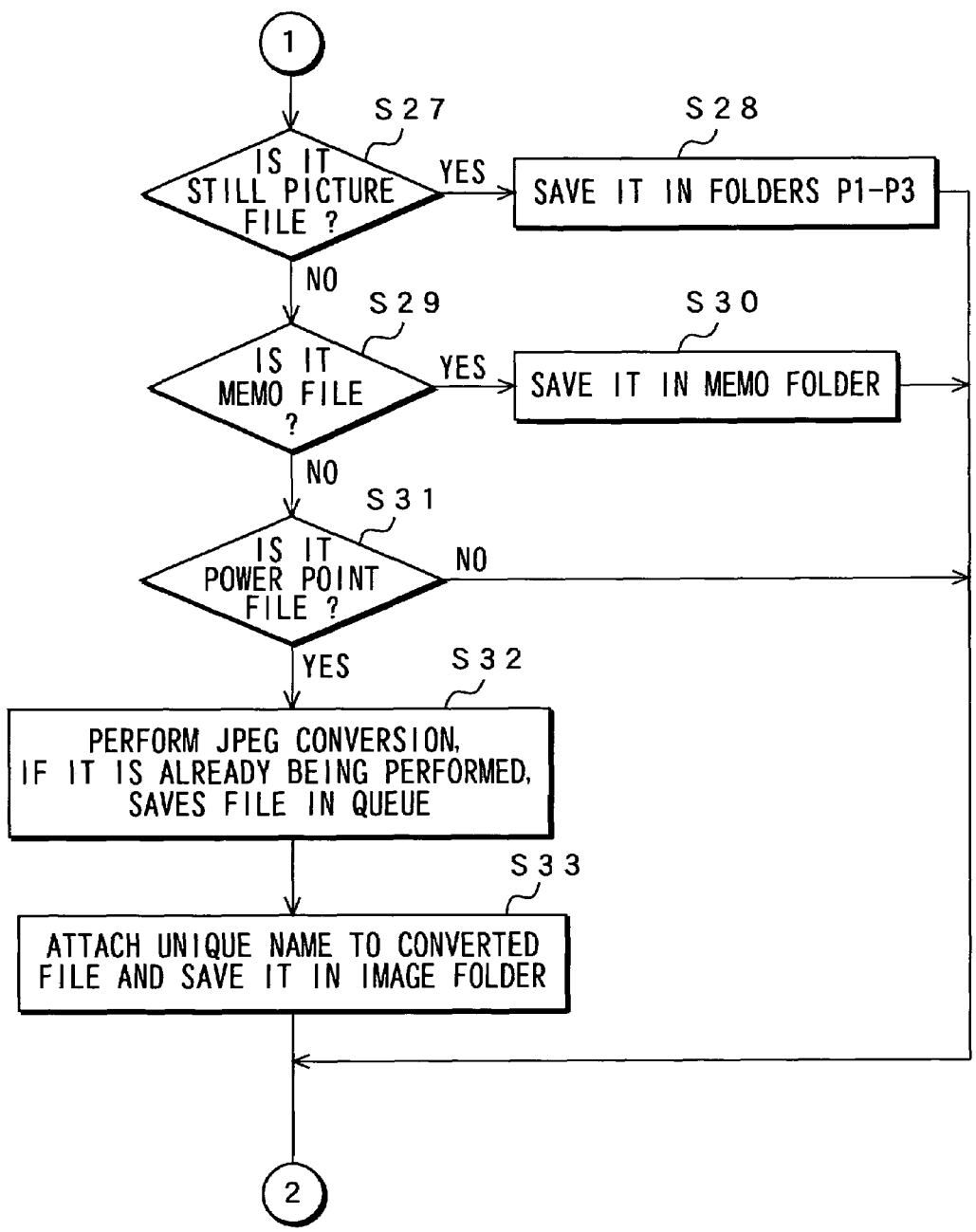

F I G. 1 3
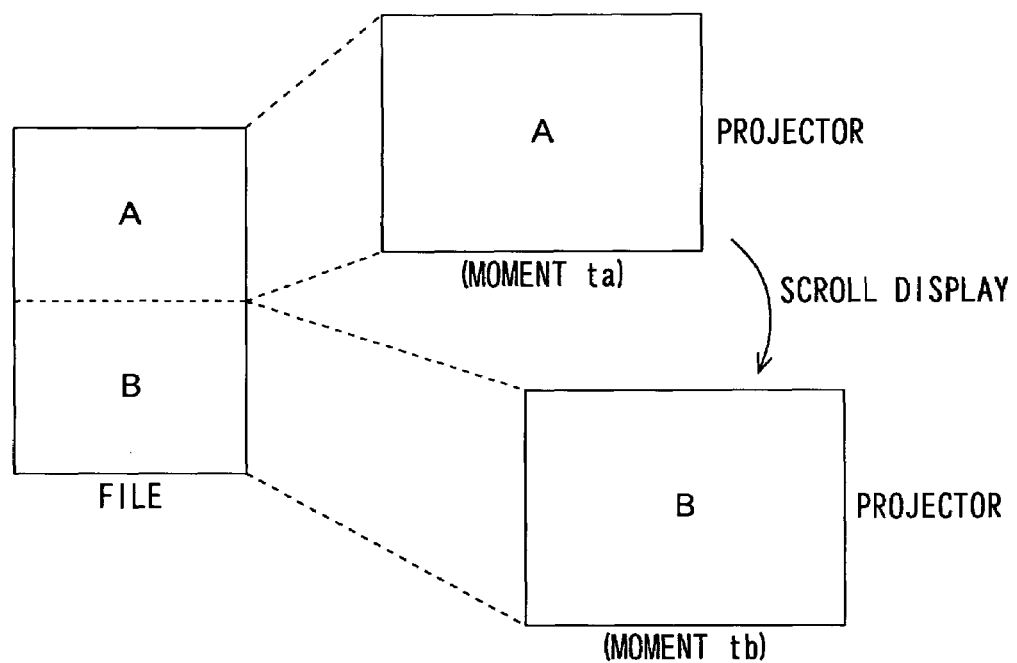

F I G. 1 4

```
{INFO
TITLE=NEW PRODUCT INTRODUCTION PARTY
DATE=07/09/2001
}
{MEDIA
<MOVING PICTURE/AUDIO FILE NAME>  <RECORDING TIME>
minutes.wmv                       2188007
}
{DATA
<DISPLAY                        <STILL PICTURE
 STARTING TIME>  <FUNCTION CODE> DISPLAY POSITION>  <FILE NAME>
00:00:00         11              P1                 20010907205009_1.jpg
00:00:15         11              P1                 20010907205009_2.jpg
00:01:08         11              P1                 20010907205009_3.jpg
00:01:08         11              P2                 20010907205119._1jpg
00:01:35         12                                 M0.txt
00:02:26         13              P2
00:03:30         11              P1                 20010907205009_4.jpg
00:03:42         12                                 M1.txt
00:04:55         14
00:05:19         11              P3                 20010907205628_21.jpg
00:05:21         11              P1                 20010907205009_5.jpg
00:16:22         11              P1                 20010907205009._8jpg
00:28:26         13              P1
}
```

INFORMATION CREATING METHOD INFORMATION CREATING APPARATUS AND NETWORK INFORMATION PROCESSING SYSTEM

TECHNICAL FIELD

The present invention relates to an information creating method, an information creating apparatus, and a network information processing system. More specifically, first it relates to an information creating method, an information creating apparatus, and a network information processing system by which, when a plurality of displays is used to display moving picture/audio information sent from a moving picture/audio input apparatus, multiple pieces of still picture information displayed on the respective displays are recorded in synchronization with the moving picture/audio information and reproduction contents are created from the pieces of information, thereby providing simultaneous display of the multiple pieces of still picture information, even if they are provided from the plurality of displays, to enable information display to be prevented from dropping out.

Accordingly, in a case where a network information processing system related to the present invention is applied to an electronic conferencing system etc., even when a plurality of projectors is used to display presentation materials so that a conference may proceed, it is possible to record a plurality of presentation materials displayed on the plurality of projectors and, when their contents are to be reproduced, display these presentation materials on the same screen in synchronization with proceeding of the conference.

Second, the present invention relates to an information creating method, an information creating apparatus, and a network information processing system by which, even in a case where multiple pieces of still picture information is provided from a plurality of displays, by providing simultaneous display of the multiple pieces of still picture information and actually providing zoomed-up display of pieces of still picture information that are being actually reproduced in synchronization with resultant moving picture/audio information, it is possible to easily view contents of this still picture information.

Accordingly, in a case where a network information processing system related to the present invention is applied to an electronic conferencing system etc., it is possible to display presentation materials on the same screen in synchronization with proceeding of a conference and provide zoomed-up display of these presentation materials actually used so that contents thereof may be viewed easily.

Third, the present invention relates to an information creating method and a network information processing system by which multiple pieces of still picture information displayed on a plurality of displays are recorded together with a reproduction management list in synchronization with moving picture/audio information so that in reproduction, these pieces of still picture information can be displayed on a same screen and also that, even when the moving picture/audio information is reproduced in a seeking mode, by referencing reproduction-time information inserted in this moving picture/audio information and time-management information present in the reproduction management list, thereby enabling the still picture information corresponding to the seek finish time to be reproduced.

Accordingly, in a case where a network information processing system related to the present invention is applied to an electronic conferencing system etc., a target image can be reflected and presentation materials related to the target image can be displayed with an image reflecting a condition of a conference being sought, thereby displaying the same materials as those actually used in the actually held conference in synchronization with that image even when it has been sought.

Fourth, the present invention relates to an information creating method, an information creating apparatus, and a network information processing system by which, when a plurality of displays is used, multiple pieces of still picture information respectively displayed on them are recorded in synchronization with moving picture/audio information and, if a capture instruction is given, one of the pieces of still picture information on the display to which the capture instruction is given is recorded, thereby enabling closer correspondence between the moving picture/audio information and the still picture information to be established.

Accordingly, in a case where a network information processing system related to the present invention is applied to an electronic conferencing system, when a conference is being advanced with the presentation materials being displayed using a video projector, the same materials as those used in the actually held conference can be recorded and reproduced by giving a capture instruction when scrolling causes a mismatch of displayed contents even if it is one of the presentation materials have been used first.

BACKGROUND ART

Conceivable information processing systems by way of a network may include a network electronic conferencing system (network conferencing system), a network education system, a network game system, etc.

For example, in a network electronic conferencing system of these, a condition of a conference is photographed by a video camera and moreover, materials used in presentation are supplied to conference attendees using a video projector.

To record information thus obtained and create conference proceedings (conference contents) from this information later, typically it has been common to store moving picture/audio information obtained by shooting the condition of the conference and still picture information (presentation materials used in presentation) used in the conference separately from each other. This is because often the moving picture/audio information that has recorded the conference condition is managed by a promoter of the conference and the presentation materials are managed by a person (presenter) who has presented the materials himself. With this, later, a conference attendee, when ordered by the conference promoter, would use these pieces of information stored separately from each other to create conference proceedings as electronic data (conference contents).

Conference contents are thus created utilizing the moving picture/audio information and the presentation materials stored separately from each other and so it is troublesome. In addition, it gives rise to the following problems.

To hold a conference, the number of projectors (video projectors etc.) used in it is not limited to one. Often, several projectors are often used to display different presentation materials while a conference is proceeding.

In a case where one projector is used, it is possible to create conference proceedings of the day electronically by repeating processing of reviewing a timing for inserting presentation materials as reproducing moving picture/audio information included on the day and, at an appropriate timing, inserting the presentation materials into the moving picture/audio information.

However, in a case where several projectors are used to display different presentation materials as a conference is proceeding, it is not clear which one of the presentation materials is used in each of scenes as presentation is proceeding.

Even if a timing for using each of the presentation materials is known beforehand, in many cases a timing cannot be determined for synthesizing the presentation materials into moving picture/audio information; moreover, in such a case, the new presentation materials have been inserted in place of the presentation materials used immediately previously, so that the previous presentation materials disappear. However, in an actual conference, in many cases both of the materials are used while the conference is proceeding. Therefore, the same condition of a conference as that which has actually been held cannot be reproduced in conference contents, which are proceedings.

Further, a promoter (presenter) of a conference transfers necessary presentation materials to a projector (video projector etc.) to display them on the video projector in synchronization with proceeding of the conference, in which case preferably the materials are recorded each time they are transferred to the projector because they can be recorded as materials that go in line with the proceeding of the conference.

In this case, if a condition of the conference could be recorded at the same time, the condition of the conference as well as presentation materials used in it can be reproduced simultaneously with each other, so that recorded information can be reorganized after recording is finished, to be used as proceedings (conference contents) of the conference.

The conference contents, if converted into, for example, an HTML format, can be viewed or copied by a specific third party via a network, which is very convenient for the purpose of sharing the conference contents.

In the conference contents, when a conference image, which is a portion of the conference contents, is being reproduced, to reproduce presentation materials used in the conference in synchronization with the image, such a method may be conceivable that address information, for example, a URL required to access still picture information of still pictures, text data, etc. is written into a portion of streaming data of this conference image, for example, a header portion or a user area.

In reproduction, by retrieving the inserted address information with this streaming data being reproduced and, when the address information is detected, reproducing the corresponding presentation materials allows this presentation materials to be reproduced in synchronization with the conference image, thus creating conference contents having realistic sensations to the fullest.

However, such a case occurs that, in reproduction of conference contents, one wants to seek for a reproduction screen until he or she finds desired conference contents to be reproduced by skipping the other contents partway. In this case also, although the conference image can be reproduced at an arbitrary seeking point in time, preferably the corresponding presentation materials are reproduced simultaneously in synchronization with the relevant conference image.

However, in a case where the above-mentioned method is employed for inserting the address information into streaming data of an image, if the address information has been inserted into such streaming data that normal reproduction starts when seeking is finished, in synchronization with a relevant conference image, the corresponding presentation materials can be reproduced and displayed.

However, if no address information has been inserted into the image streaming data when seeking is finished, the corresponding presentation materials cannot be retrieved, so that presentation materials displayed on the reproduction screen are not updated and, therefore, less recent presentation materials not related directly to the conference image being reproduced are displayed.

It is thus impossible to achieve a desired purpose of reproducing and displaying presentation materials in synchronization with a conference image.

Further, the above-mentioned presentation materials need to be stored in conference proceedings. For this purpose, for example, such a method may be available for checking when the presenter transfers the materials to a projector so that each time the materials (files) are transferred, they may be recorded (stored) each file.

However, if a size (data quantity) of each of the materials to be displayed is large, there occurs such a case where not all portions of the materials can be displayed on the projector. In such a case, although the file data is all transferred to the side of the projector, not in rare cases the projector displays a portion of the material often, thus resulting in the conference going on while this displayed material is being explained. In main cases, the remaining portions of the transferred materials are displayed with scrolling the screen according to how the explanation goes on so that details of the displayed materials may be explained again as viewing the materials.

In such a case of a conference proceeding, to create a conference contents more synchronously with the actual conference, besides the all materials transferred to the video projector, materials that have been used in an actual explanation also become important in creation of conference contents.

However, by the above-mentioned method of recording presentation materials only when it is transferred to the projector, it is impossible to supply sufficient materials to create conference contents.

This holds true also with a case where presentation materials cover several pages, so that the conference is advanced with specifying a specific page. In such a case, it is necessary to grasp materials being actually displayed on the video projector as a material being used for presentation.

This conferencing system gives rise to almost the same problems not only in a case where a conference is carried out in one conference room but also in such a case where a conference is advanced by electronically connecting a plurality of conference rooms to each other over a network or remote-located conference rooms (e.g., a plurality of locations such as headquarter offices, branch offices, factories, and laboratories) connected to each other over a network.

Such problems occur not only in a network electronic conferencing system but also in a network education system for giving classes between preparatory schools, sister schools, etc. utilizing a network, and in a network game system for playing a game between a plurality of persons located remotely from each other, etc.

To solve these problems, the present invention has been developed and, it is a first object of the present invention to, especially even in a case where a plurality of displays is used, enable still picture information displayed on these displays to be recorded one and all and, also in reproduction, to display all the still picture information on the same screen and zoom up in some of the still picture information actually being used.

It is a second object of the present invention to enable still picture information related to moving picture/audio information o be reproduced in synchronization with this moving picture/audio information and, even when the moving picture/audio information is sought, to be reproduced the still picture information related to the moving picture/audio information when it is sought.

It is a third object of the present invention to enable not only the still picture information displayed on a display to be recorded in synchronization with moving picture/audio information but also the still picture information for which a capture instruction is issued to be recorded in synchronization with this moving picture/audio information so that such contents as to go in line with an actual conference may be created.

DISCLOSURE OF THE INVENTION

An information creating method related to the present invention comprises the steps of recording moving picture/audio information obtained from a moving picture/audio input apparatus connected to a network, recording still picture information displayed on a plurality of displays connected to the network, and when the still picture information is recorded, creating a reproduction management list of the still picture information that corresponds to the moving picture/audio information.

An information creating apparatus related to the present invention comprises information recording means for recording information supplied via a network, reproduction list creating means for creating a reproduction management list at the time of information reproduction based on the information supplied via the network, contents-creating means for reorganizing the information as contents in which the information is reproduced via a network, using the reproduction management list, and control means for controlling each of the information recording means, the reproduction list creating means, and the contents-creating means.

A network information processing system related to the present invention comprises at least one information processor having an input operation function and processing arbitrary information, a display for displaying an image based on at least information transferred from the information processor, an information processing assisting apparatus for assisting network information processing including the display based on an input operation instruction from the information processor, communication means for connecting the information processing assisting apparatus and the information processor to each other, a moving picture/audio input apparatus for inputting an image and audio other than the information that is transferred from the information processor, and information creating apparatus for recording information transferred from the information processor and the moving picture/audio input apparatus in accordance with an instruction from the information processor and reorganizing this information as contents communicated via a network, wherein the information creating apparatus includes information recording means for recording information supplied via the network, reproduction list creating means for creating a reproduction management list at the time of information reproduction based on the information supplied via the network, contents-creating means for reorganizing the information as contents in which the information is reproduced via the network, using the reproduction management list, and control means for controlling each of the information recording means, the reproduction list creating means, and the contents-creating means.

Another information creating method related to the present invention comprises the steps of, when recording multiple pieces of still picture information displayed on a plurality of displays in synchronization with moving picture/audio information from a moving picture/audio input apparatus and editing the recorded pieces of information for reproduction thereof, selecting a display pattern of reproduction-screen in accordance with the number of the displays to reproduce and display the multiple pieces of still picture information on the same screen simultaneously, and zooming up and reproducing one piece of the still picture information displayed in the display pattern by instructing an icon displayed in the display pattern.

Another information creating apparatus related to the present invention comprises information recording means for recording each of moving picture/audio information from a moving picture/audio input apparatus and still picture information from a plurality of displays, reproduction management list creating means for listing attribute information about multiple pieces of input still picture information, organizing means for reorganizing the moving picture/audio information and the still picture information with a display pattern in which the multiple pieces of still picture information are displayed on a display screen simultaneously being selected, based on attribute information from the reproduction management list creating means, and control means for controlling the plurality of means.

Another network information processing system related to the present invention comprises at least one information processor having an input operation function and processing arbitrary information, a display for displaying an image based on at least information transferred from the information processor, an information processing assisting apparatus for assisting network information processing including display processing in the display based on an input operation instruction from the information processor, communication means for connecting the information processing assisting apparatus and the information processor to each other, a moving picture/audio input apparatus for inputting an image and audio other than the information transferred from the information processor, and an information creating apparatus for recording information transferred from the information processor and the moving picture/audio input apparatus in accordance with an instruction from the information processor and reorganizing it as contents communicated via a network, wherein the information creating apparatus includes information recording means for recording each of moving picture/audio information from the moving picture/audio input apparatus and still picture information from the plurality of displays, reproduction management list creating means for listing attribute information about multiple pieces of input still picture information, organizing means for reorganizing the moving picture/audio information and the still picture information with a display pattern in which the multiple pieces of still picture information are displayed on a display screen simultaneously being selected, based on the attribute information from the reproduction management list creating means, and control means for controlling the plurality of means.

A further information creating method related to the present invention comprises the steps of, when recording pieces of still picture information displayed on a plurality of displays together with a reproduction management list in synchronization with moving picture/audio information from a moving picture/audio input apparatus and reproducing these pieces of the recorded information, selecting a display pattern of a reproduction screen in accordance with the number of the displays to reproduce and display the multiple pieces of still picture information on the same screen simultaneously, reproducing the moving picture/audio information and the still picture information in chronological order in which they have been recorded, when the moving picture/audio information is being reproduced in a seeking mode, collating reproduction time information attached to this moving picture/audio information and time management information included in the reproduction management list to each other, to retrieve still picture information that matches reproduction time of the moving picture/audio information when the seeking-operation is finished, and reproducing the retrieved still picture information.

A further network information processing system related to the present invention comprises at least one information processor having an input operation function and processing arbitrary information, a display for displaying an image based on at least information transferred from the information processor, an information processing assisting apparatus for assisting network information processing including display processing in the display based on an input operation instruction from the information processor, communication means for connecting the information processing assisting apparatus and the information processor to each other, a moving picture/audio input apparatus for inputting an image and audio other than the information transferred from the information processor, and information creating apparatus for recording the information transferred from the information processor and the moving picture/audio input apparatus in accordance with an instruction from the information processor and reorganizing this information as contents communicated via a network, wherein the information creating apparatus includes information recording means for recording each of moving picture/audio information from the moving picture/audio input apparatus and still picture information from the plurality of displays reproduction management list creating means for listing attribute information about multiple pieces of input still picture information, organizing means for reorganizing the moving picture/audio information and the still picture information with a display pattern in which the multiple pieces of still picture information are displayed on a display screen simultaneously being selected based on the attribute information from the reproduction management list creating means, and control means for controlling the plurality of means, and wherein when a seeking instruction about the moving picture/audio information is input, the control means allowing for retrieving the time management information in the reproduction management list on the basis of reproduction time information attached to the moving picture/audio information reproduced by the information recording means, to reproduce still picture information that matches reproduction time of the moving picture/audio information when the seeking-operation is finished.

A still further information creating method related to the present invention comprises the steps of recording still picture information transferred to a plurality of displays at a timing when it is transferred to the displays, in synchronization with moving picture/audio information from a moving picture/audio input apparatus, and recording still picture information displayed on the displays among the pieces of the transferred still picture information, in accordance with a capture instruction.

A further information creating apparatus related to the present invention comprises information recording means for recording each of moving picture/audio information from a moving picture/audio input apparatus and still picture information from a plurality of displays, reproduction management list creating means for listing attribute information about multiple pieces of input still picture information, organizing means for reorganizing the moving picture/audio information and the still picture information with a display pattern in which the multiple pieces of the still picture information are displayed on a display screen simultaneously being selected, based on the attribute information from the reproduction management list creating means, and control means for controlling the plurality of means, wherein the still picture information to be recorded in the information recording means includes still picture information transferred to the plurality of displays at a timing when it is transferred to the plurality of displays and still picture information displayed on the displays when a capture instruction is given, among the pieces of the transferred still picture information.

A still further network information processing system related to the present invention comprises at least one information processor having an input operation function and processing arbitrary information a display for displaying an image based on at least information transferred from the information processor, an information processing assisting apparatus for assisting network information processing including display processing in the display based on an input operation instruction from the information processor, communication means for connecting the information processing assisting apparatus and the information processor to each other, a moving picture/audio input apparatus for inputting an image and audio other than information that is transferred from the information processor, and information creating apparatus for recording information transferred from the information processor and the moving picture/audio input apparatus in accordance with an instruction from the information processor and reorganizing this information as a content communicated via a network, wherein the information creating apparatus includes information recording means for recording each of moving picture/audio information from the moving picture/audio input apparatus and still picture information from the plurality of displays, reproduction management list creating means for listing attribute information about multiple pieces of input still picture information, organizing means for reorganizing the moving picture/audio information and the still picture information with a display pattern in which the plurality of still picture information pieces are displayed on a display screen simultaneously being selected, based on the attribute information from said reproduction management list creating means, and control means for controlling said plurality of means, and wherein the still picture information to be recorded in said information recording means includes still picture information transferred to the plurality of displays at a timing when it is transferred to the plurality of displays and still picture information displayed on the displays when a capture instruction is given, among the pieces of the transferred still picture information.

According to the present invention, both moving picture/audio information and still picture information are recorded. The still picture information refers to information being displayed on all of a plurality of displays when displayed on them. Simultaneously with recording of this information, a reproduction management list of the still picture information that corresponds to the moving picture/audio information is created.

A reproduction management list includes names of still picture information files, time management information such as display starting time on displays, identification information of the displays, etc. and enables chronologically grasping when and in which files the information has been displayed on each of the displays.

When recording of the information is finished, the information is reorganized into contents (HTML format) that can be reproduced via a network. Furthermore, a display pattern (screen splitting pattern) to be displayed on one screen is determined in accordance with a number of the displays being used.

In a reproduction mode, the still picture information is all displayed as inserted in a split screen that corresponds to a display pattern determined on the basis of a reproduction management list. In a fixed display area different from this, the moving picture/audio information is displayed. It is thus possible to eliminate such a problem that only a specific piece of still picture information is reproduced.

When a zoom-up instruction on a still picture information being displayed actually is transferred, this still picture information is zoomed up. For example, it is actually zoomed up by selecting a display pattern (maximum display pattern), which is displayed when only one display is used. It is thus possible to easily view contents of the still picture information and improve visibility. If the still picture information is replaced with a new one, this updated new still picture information is also zoomed up.

When moving picture/audio information is being reproduced in the seeking mode, reproduction time information attached to this moving picture/audio information and time management information contained in a reproduction management list are collated to each other, to retrieve still picture information that matches reproduction time of reproduction time of the moving picture/audio information when seeking is finished. Still picture information that has been detected to match in terms of time information as a result of retrieval is reproduced as still picture information related to moving picture/audio information at the time of seeking.

In such a manner, information required to retrieve still picture information is contained in a reproduction management list having no relations with moving picture/audio information, so that even if moving picture/audio information is sought at an arbitrary point in time, still picture information related to this moving picture/audio information can be retrieved and reproduced immediately.

The captured still picture information is displayed in chronological order in which they have been captured, thereby enabling information that goes in line with an actual conference to be reproduced.

In the case of a network conference, presentation materials being used on all video projectors can be split and displayed on a same screen simultaneously, thereby creating and displaying conference contents without lacking the presentation materials.

BRIEF DESCRIPTION OF THE DRAWINGS

FIG. 1 is an illustration for showing a configuration in which a network information processing system is applied to a network electronic conferencing system;

FIG. 9 is a flowchart for showing system operations;

FIGS. 12A and 12B are flowcharts of recording operations of the creator;

FIG. 13 is an illustration for showing an example of file transfer and an actual display screen;

FIG. 14 is an illustration for showing an example of a reproduction management list;

BEST MODE FOR CARRYING OUT THE INVENTION

Figure 2:
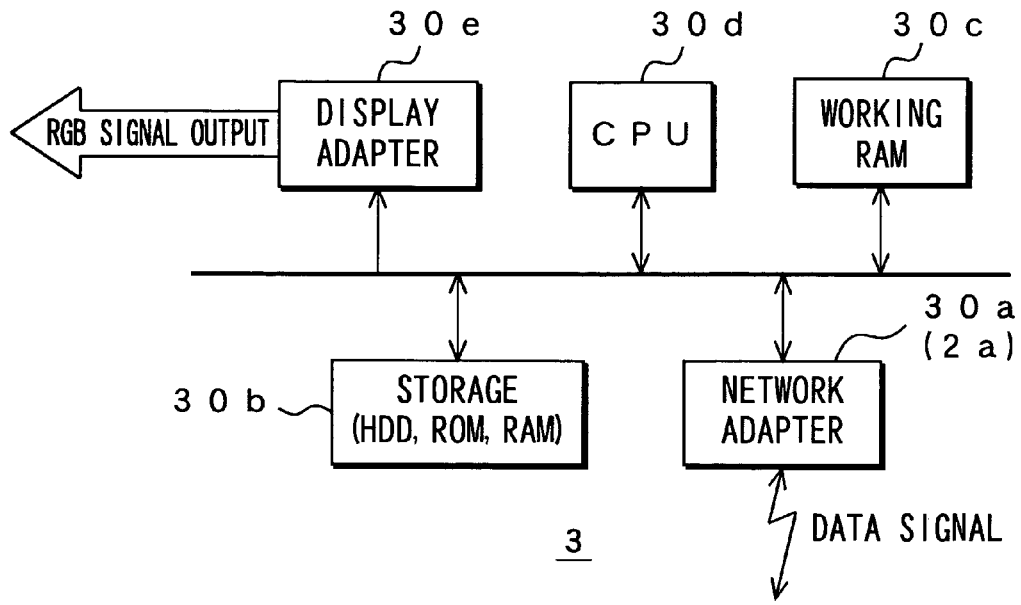
FIG. 2 is an illustration for showing a configuration of a communicator, which functions as an information processing assisting apparatus.

The following will describe in detail an information creating method, an information creating apparatus, and a network information processing system as an embodiment of the present invention with reference to drawings. For convenience of the description, the present embodiment is described with reference to a case where they are applied to a network electronic conferencing system.

A network electronic conferencing system refers to a system that transfers electronically created presentation materials to a projector acting as a display device and a conference is advanced with the materials being zoomed up. Therefore, the entire system is comprised of a computer (personal computer) acting as an information processor to manage the presentation materials as well as an information processing assisting apparatus (having a personal computer configuration) which is used to transfer the presentation materials to the display device.

FIG. 1 shows a configuration example of this network electronic conferencing system 100. This system 100 comprises an information processor (hereinafter referred to as client PC) 2 for saving and managing the presentation materials (file data) as described above and a display device (hereinafter referred to as projector) 4 constituted of a projector etc. for projecting and displaying presentation materials or calligraphic works and paintings taken through a camera as well as an information processor (hereinafter referred to as communicator) 3 constituted of a personal computer for assisting a client PC 2 and the projector 4 in data transfer, data processing, etc. between them.

The communicator 3 is controlled by the client PC 2, so that through this communicator 3, an image displayed on the video projector 4 is controlled. Therefore, the communicator 3 and the projector 4 are connected to each other through RGB cables etc.

The client PC 2 and the communicator 3 are coupled to each other by communication means (network adapter) 2a. Although the communication means 2a may be of wireless or wireline, in the present embodiment it is employed as wireless communication means.

Therefore, the client PC 2 and the communicator 3 are each equipped with a wireless LAN card (network interface card) 2a as the communication means connecting them to each other. In the case of wireless communication also, in place of the wireless LAN card, an access point (not shown) may be used through which they communicate with each other, in configuration.

To this network electronic conferencing system 100, there is further coupled via an LAN an information creating apparatus (hereinafter referred to as creator) 1 for recording a condition of a conference room as an image and audio and recording the presentation materials used in the conference to create proceedings (conference contents) of the conference. To the creator 1, a video camera 5a acting as a moving picture input apparatus and a microphone 5b acting as an audio input apparatus are connected. This moving picture/audio input apparatus 5 is directly connected to the creator 1 in this example and configured so that its operation mode can be controlled in accordance with an instruction from the client PC 2.

The communicator 3 and the creator 1 each hold a global IP address of a same segment so that these creator 1 and communicator 3 can advance a conference between remote-located conference rooms through interactive communication therebetween or a network such as the Internet. Even if the global IP addresses are of different segments, the interactive communication can be performed without a problem.

Further, to the electronic conferencing system, a server 6 serving as an information-saving apparatus is connected via the LAN so that the server 6 can save and manage the conference contents etc. collectively.

The client PC 2 has electronic conferencing application software installed therein. Up to 16 client PCs 2 can be used in one conferencing system. When a plurality of the client PCs is used, they each have a unique private IP address set thereto.

In a case where the plurality of client PCs 2 is used, a common password is set to build up a conference system having secrecy by creating an environment closed in the relevant conference room such that no external unspecified third party can attend the conference or view conference contents.

This password can be set arbitrarily by a first conference attendee, so that the remaining conference attendees can enter this password to thereby attend this conferencing system.

Any one of the conference attendees transfers presentation materials from the client PC 2 to the communicator 3 via the wireless LAN card 2a to display them on the projector 4, thereby acquiring a right for presentation. Only by operating functions keys on the client PC, he or she can give up the presentation right to turn it over to any other conference attendee, so that the conference all of the attendees reserve a qualification as a presenter.

In configuration, one of the remaining conference attendees can use the client PC 2 to control operation modes for recording, reproduction, etc. on the creator 1. That is, the one of the remaining attendees acquires a right to create materials for conference proceedings.

The following will describe components of the network electronic conferencing system 100.

Each conference room has one projector 4 installed in it, so that in the simplest basic configuration of the electronic conferencing system is constituted of one communicator 3. However, in some cases, a plurality of the projectors 4 should be used to advance the conference so that it may be administered more efficiently. This is because there may occur such a case often that different presentation materials are displayed on a plurality of projectors simultaneously and used in explanation.

In such a case, basically the communicators 3 are arranged in accordance with the number of the projectors 4 installed. FIG. 1 gives a configuration example in a case where the three projectors 4 are used. In such a case of using a plurality of the communicators 3, one of them is used as a main communicator 3a and the remaining two are used as sub-communicators 3b and 3c.

In this case, control system is such that presentation materials etc. sent from the client PC 2 may be managed by the main communicator 3a and displayed on projectors 4b and 4c through the sub-communicators 3b and 3c respectively. Therefore, the sub-communicators 3b and 3c each own a private IP address. It also is possible to control the plurality of communicators 3a, 3b, and 3c independently of each other.

The main communicator 3a has also a function to send via the LAN to the creator 1 presentation materials themselves transferred from the client PC 2 and attribute information about a condition when a page for these presentation materials has been turned over (time when the page has been turned over, information of the page, etc.) as reproduction management information or receive information recorded in the creator 1 in accordance with an instruction from the client PC 2 and distribute it to the client PC 2.

FIG. 2 shows a configuration of the communicator 3. As shown in FIG. 2, the communicator 3 is comprised of a network adapter 30a for transmitting presentation materials to and receiving them from the client PC 2, a storage 30b in which processing programs are stored, a working memory (working RAM) 30c, a CPU 30d, and a display adapter 30e for outputting presentation materials using RGB signals.

As the network adapter 30a, the above-mentioned wireless LAN card 2a is used in this example. The storage 30b stores basic software (electronic conferencing application software) that activates the communicator 3 and processing programs for processing presentation materials.

The working RAM 30c is used to accumulate received presentation materials temporarily and process them. The presentation materials are converted into the R, G, and B signals under the control of the CPU 30d and supplied to the display adapter 30e. The projector 4 is connected to the communicator 3 through RGB cables.

Figure 3:
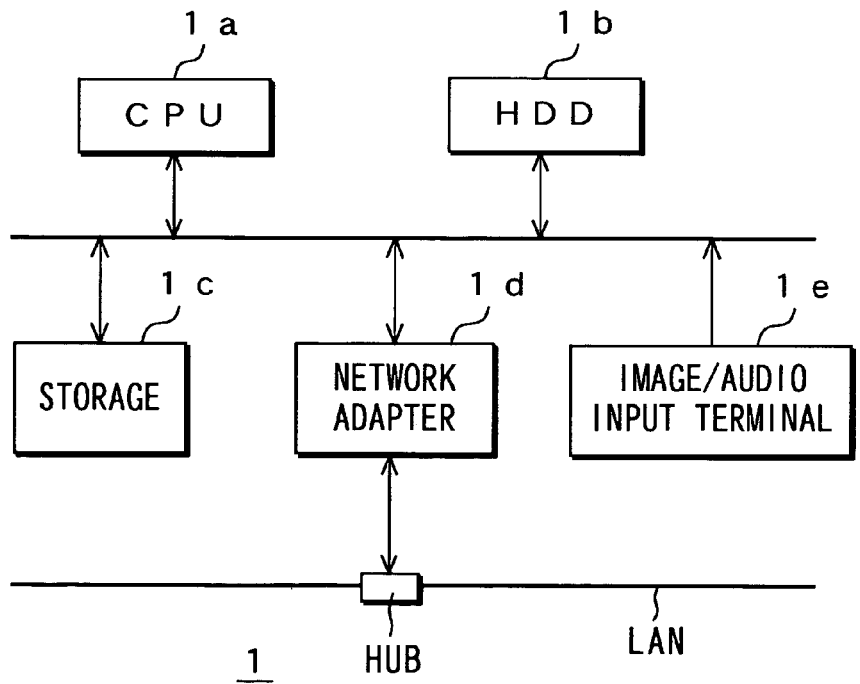
FIG. 3 is an illustration for showing a configuration of a creator, which functions as an information creator.

FIG. 3 shows a configuration of the creator 1. This creator 1 comprises a CPU 1a for processing programs, a working memory (hard disk HDD in this example) 1b for processing transmitted/received information (information such as moving pictures and still pictures), a storage 1c for storing information such as moving picture/audio etc. including presentation materials and a control program for processing them, and a network adapter 1d for connecting the communicator 3. The creator 1 further comprises an image/audio input terminal (I/O interface) 1e for receiving or controlling moving picture/audio information from the moving picture/audio input apparatus 5.

This creator 1 records information about presentation materials displayed at the communicator 3 as described above and also records information such as that (IP addresses, face photos, etc.) of attendees who have attended an electronic conference transferred from the communicator 3 as well as moving picture/audio information. It also has a function to automatically create conference contents, which may be called conference proceedings, when the recording is finished. How to create the conference contents automatically will be described later.

If a plurality of the client PCs is present as described above, one of these client PCs 2 conducts control on the creator 1 and the moving picture/audio input apparatus 5. That is, they are controlled by the client PC 2 (client PC for a clerical-worker) acting as a clerical worker.

Figure 4:
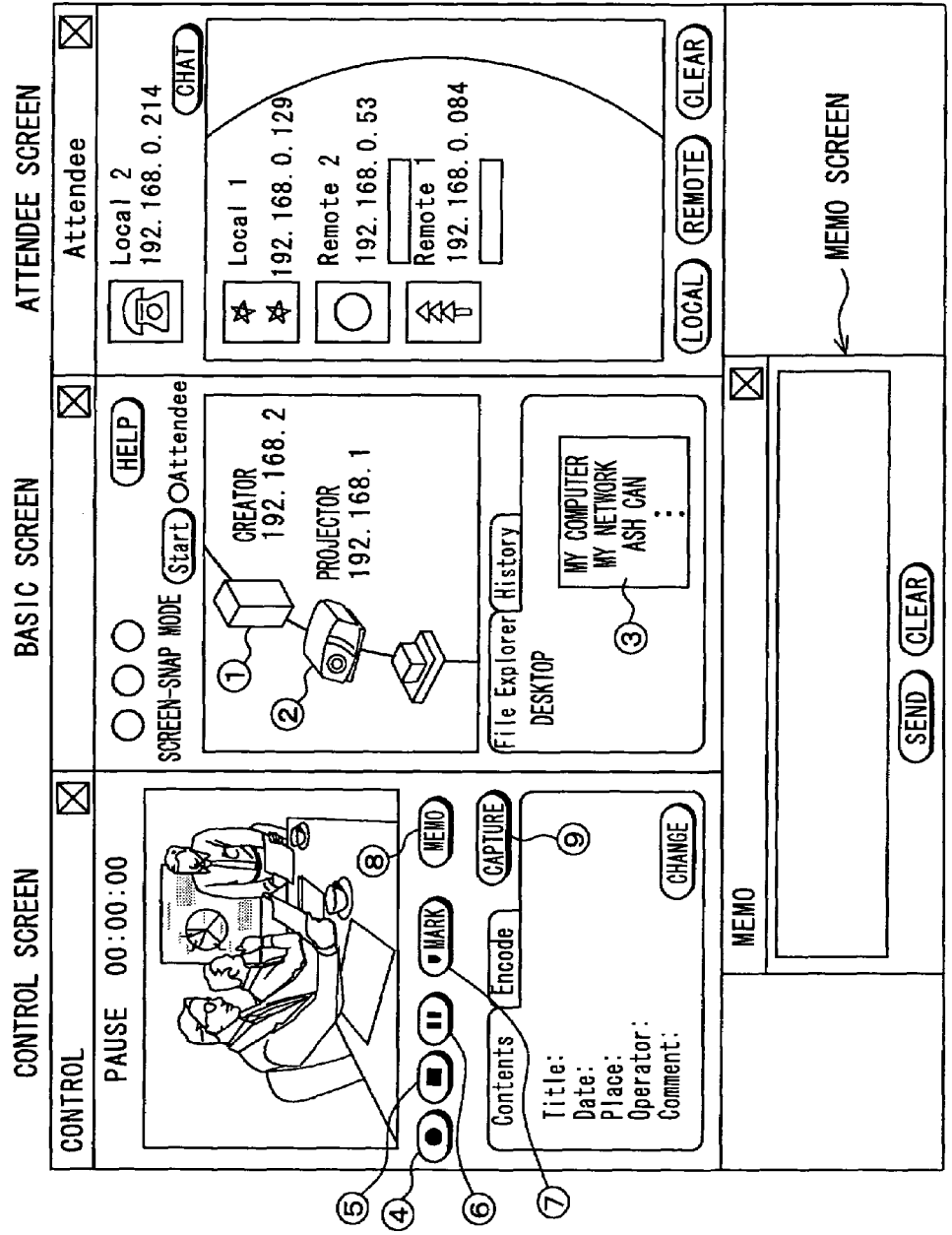
FIG. 4 is an illustration for showing a display screen of a client PC, which functions as an information processor.

For any client PC 2 to become the clerical-worker client PC, it is necessary for it only to open a control (CONTROL) screen, which is used as an operating screen for the creator 1. If any client PC has opened the control screen, an inhibition flag is set at the communicator 3 so that none of the remaining client PCs can become the clerical client PC. FIG. 4 is an illustration for showing one example of a GUI screen, which is displayed on a display screen of the clerical client PC.

This display screen is roughly composed of three vertically split display screens in such a configuration that at a middle on this display screen a basic screen for the client PC side is displayed, on its right side an attendee screen is displayed which displays information about attendees of the conference, and on the left side of the basic screen a control screen is displayed which controls the creator 1. Further, at the bottom on the screen, a horizontally long memo screen is displayed.

At the top on the basic screen, icons of devices connected to the electronic conferencing system are displayed. In the figure, an icon ① of the creator 1, an icon ② of the communicator 3, etc. are displayed. Although not given a reference symbol in the figure, an icon of the moving picture/audio input apparatus 5 is also displayed.

A lower side of the basic screen is used as a list field for files, in which file names ③ accumulated in the client PC are displayed.

In the attendee screen, there are displayed face photos of attendees, private IP addresses of the client PC 2 that the attendee owns, etc.

In the control screen, its top is used as an image display portion, where images picked up by the video camera 5a are displayed as a moving picture. Its middle portion is used as a band-like display area, in which a plurality of soft keys including the function keys is operated; and its bottom is used as an input portion for inputting a title etc. In this soft key operation portion, there are displayed a REC key ④, a STOP key ⑤, and a PAUSE key ⑥ as well as a MARK key ⑦ for marking important image locations during recording, a MEMO key ⑧ for opening the memo screen, and a CAPTURE key ⑨ for saving still picture information (presentation materials) displayed on the projector 4 and the like.

When the client PC 2 has logged on the communicator 3, only the basic screen is displayed on its display screen. By dragging a file in the file list ③ to the icon of the communicator 3 and dropping it there, data of this file (presentation materials) is transferred to the communicator 3 and displayed on the projector 4 so that it can be presented. However, this holds true with a case where these operations are performed by the client PC 2 that has acquired a presenter's qualification.

When an ATTENDEE key on the basic screen is pressed, the attendee screen is displayed on its right side as shown in FIG. 4.

Figure 5:
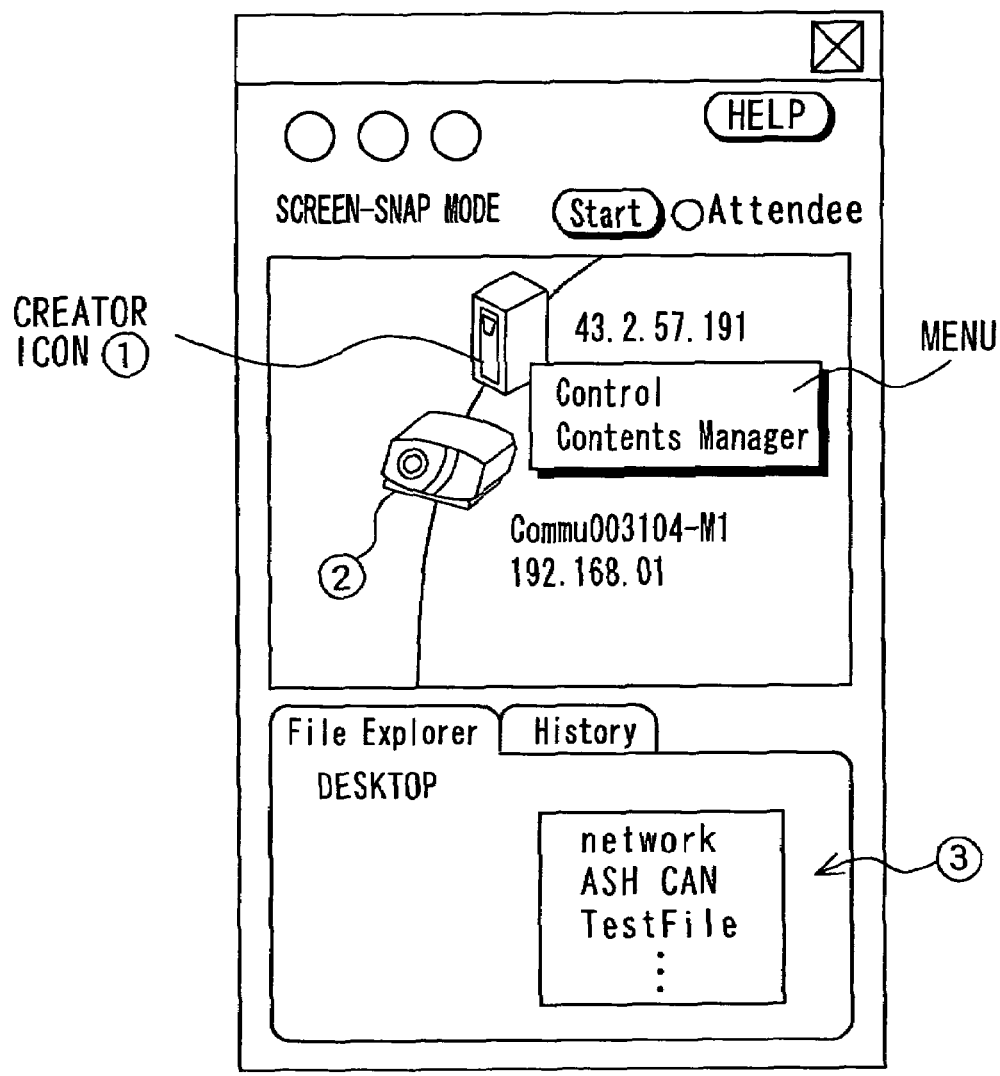
FIG. 5 is an illustration for showing a condition where a creator menu is displayed.

When the creator icon ① is clicked on with a right mouse button, such a menu screen as shown ion FIG. 5 is displayed and, when "CONTROL" is selected on this menu screen, the control screen shown in FIG. 4 is displayed. When the MEMO key ⑧ is operated on the control screen, the memo screen is displayed at a screen position shown in FIG. 4 so that sentences etc. can be input in it. The memo screen occupies a space of four to six lines.

When "Contents Manager" is selected on the menu screen shown in FIG. 5, a list menu (creator contents manager screen) for conference contents saved in the creator 1 is displayed.

Figure 6:
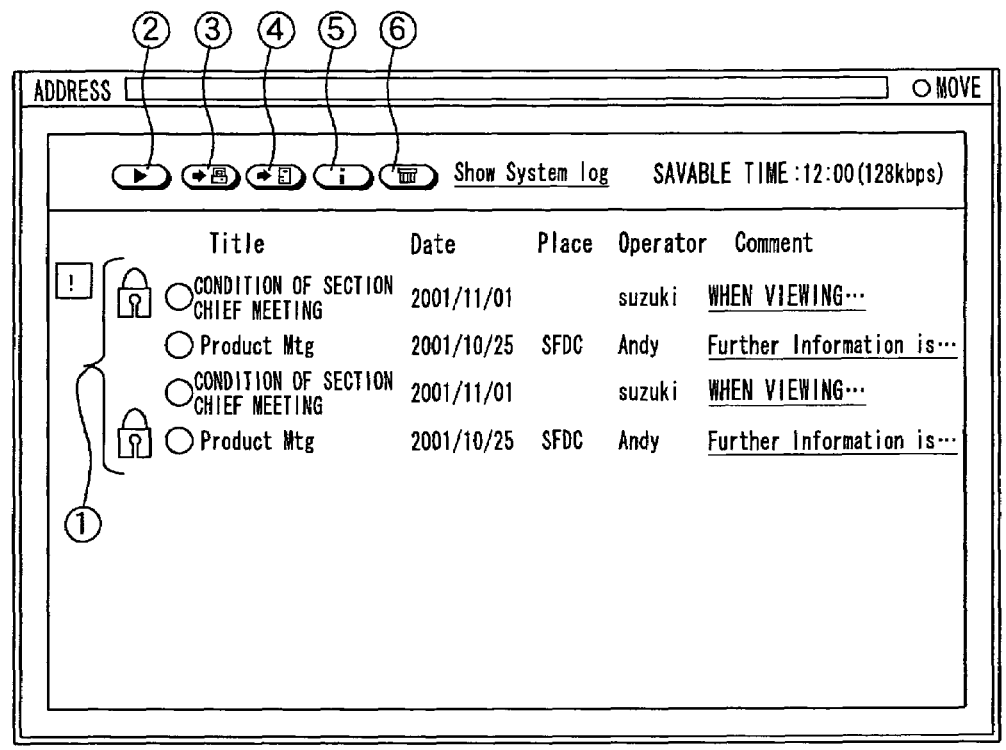
FIG. 6 is an illustration for showing a contents-manager screen.

FIG. 6 shows an example where this creator contents manager screen is displayed. On this screen are displayed a contents list ① saved in the creator 1 as well as soft keys for selecting an operating mode for a selected contents list. In the present embodiment, there are displayed a Review key ② for reproducing the selected contents, a transfer-to-client key (Download-to-My-Computer key) ③ for transferring the selected contents to the client PC 2, a transfer-to-server key (Upload-to-Server key) ④ for transferring the selected contents to a server, a details key (Show-Contents-Information key) ⑤ for viewing detailed information of the selected contents, a Delete key ⑥ for erasing the selected contents, etc.

Although the above-mentioned network electronic conferencing system 100 including, especially, an aspect of system as shown in FIG. 1, is an electronic conferencing system wherein a network is built up only in one conference room, another network electronic conferencing system may be built up.

Figure 7:
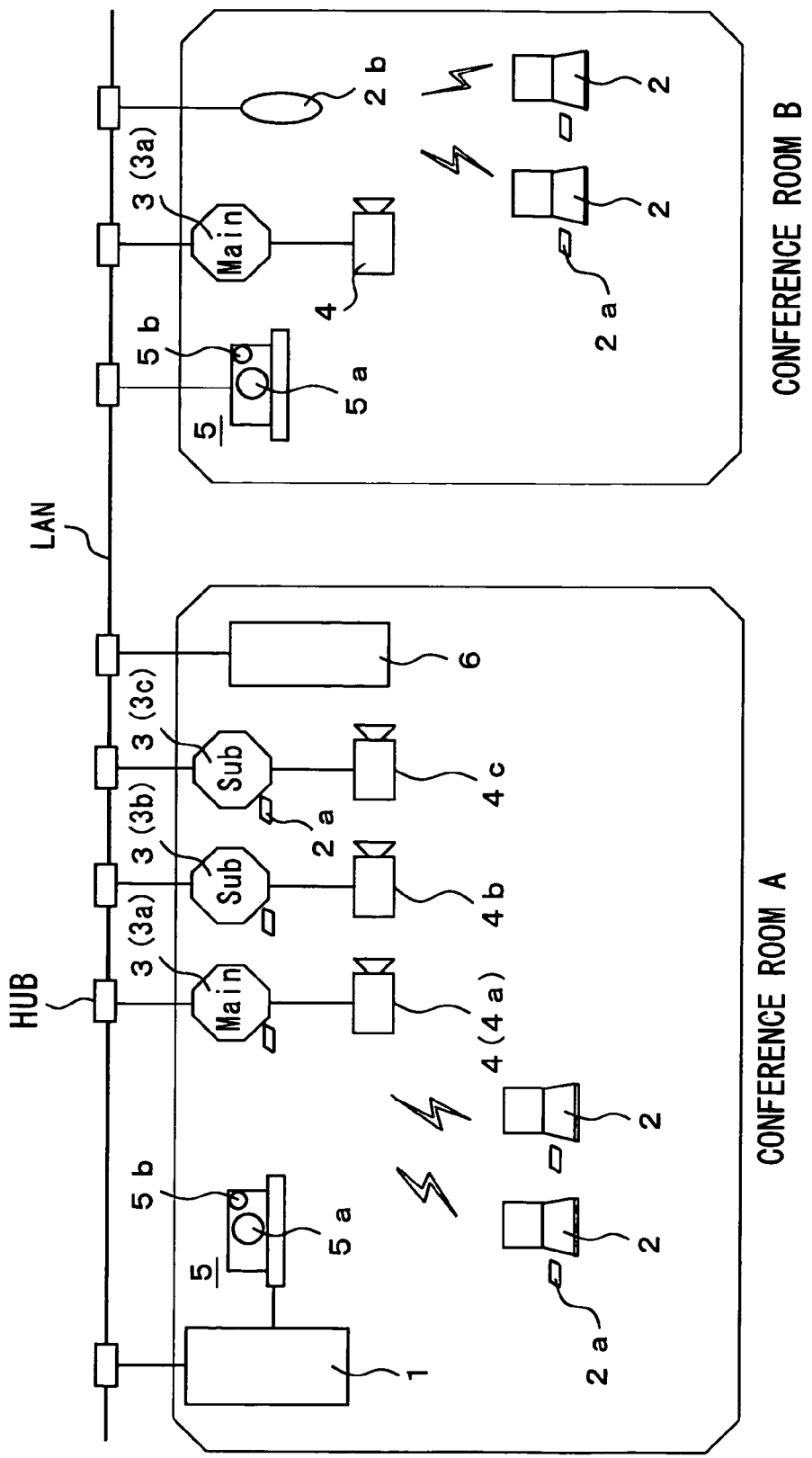
FIG. 7 is an illustration for showing another example of the network electronic conferencing system.

A network electronic conferencing system 200 shown in FIG. 7 is applied to a case where a conference is advanced with presentation being given utilizing a plurality of, for example, two conference rooms.

Although conference rooms A and B in this case have a same system build-up, they may be of different system build-ups in some cases. FIG. 7 shows an aspect for such a case. A system of the conference room A is equipped with a creator 1, client PCs 2, communicators 3, projectors 4 connected to communicators 3, and a moving picture/audio input apparatus 5. The three projectors are provided. Therefore, the number of communicators 3 provided is three. As communication means, a wireless LAN card 2a is used.

The conference room B also has the same configuration but, in this embodiment, is equipped with only one projector 4 and so one communicator 3 is installed in it. Further, the conference room B is configured so that the client PCs 2 and the communicator 3 etc. may communicate with each other via an access pint 2b.

The two conference rooms A and B are connected to each other by a LAN. It is possible to participate in presentation in the conference room A through the access point 2b by using the client PCs 2 in the conference room B side.

In this case, if a presenter in, for example, the conference room A transfers presentation materials to the communicator 3 in the conference room A to display the materials on the projector 4 for the main communicator, the same presentation materials are transferred also to the communicator 3 in the conference room B and displayed on the projector 4 in it.

If, then, a pointer on a display screen is moved using the mouse etc., a pointer in the conference room B is also displayed in the same position by interactive display control. That is, the conference rooms A and B have a mirror display configuration.

This holds true also with a case where a material is transferred from the conference room B to the conference room A. In this case, however, none of the sub-communicators 3b and 3c in the conference room A is used because the conference room B has only one projector.

Figure 8:
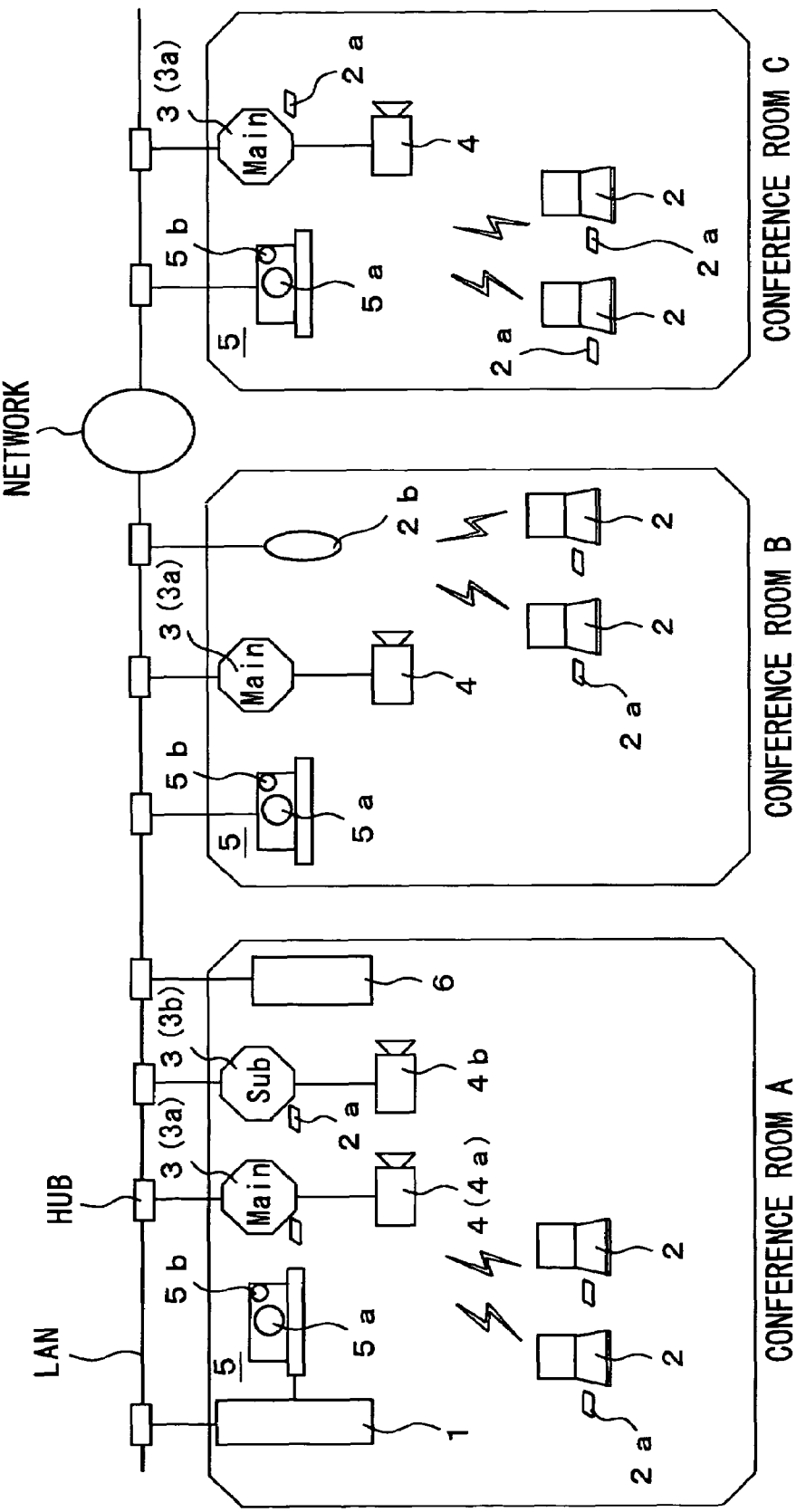
FIG. 8 is an illustration for showing a further example of the network electronic conferencing system.

FIG. 8 shows a case where the present embodiment has been applied to a network electronic conferencing system 300 when presentation is performed between conference rooms positioned at two remote locations.

This system 300 has a configuration in which conference rooms A and B are coupled to each other by an LAN and a communication line of the conference rooms A and B and that of a remote-located conference room C are connected to each other by a network. It is assumed that such a system as described with reference to FIG. 1 or 7 is built up in each of the conference rooms A, B, and C. Therefore, detailed description of each of the system components is omitted. It is sufficient to commonly install one creator 1 and one server 6.

In this case also, mirror display of presentation materials by use of a projector provided in each of the conference rooms is realized in communication between communicators 3 of the conference rooms A, B, and C, so that conference attendees can participate in conferencing while viewing the same displayed materials simultaneously. Further, even between the remote locations, it is possible to display pointers in synchronization with each other on the same display screen according to movements of the mouse.

The following will describe operations of this network electronic conferencing system 100 with reference to FIG. 9.

First, at step S1, electronic conferencing application software is activated using the client PC 2 of an attendee of a conference, to log on the communicator (or main communicator) 3.

In this case, the first conference attendee sets a password, so that the subsequent attendees can attend the conference by entering this password, as already described. The password is not a unique value determined for the electronic conference system beforehand, so that it is possible to eliminate such an improper problem that the electronic conferencing system cannot be activated because the password is forgotten or mistaken.

When a conference attendee opens the control (CONTROL) screen, which is an operating screen of the creator 1, at step S2, only that client becomes a clerical client PC (see FIG. 4).

When the icon ① see FIG. 4) is clicked on with the right mouse button on a GUI screen of the client PC 2 to select "CONTROL" from a displayed menu, the control screen is displayed (see FIG. 4).

When the REC key ④ (see FIG. 4) is pressed on the control screen at step S3, the moving picture/audio input apparatus 5 is actuated to start recording an image of the conference.

If the MEMO key ⑧ (see FIG. 4) is pressed on the control screen, on the other hand, the memo screen such as shown in FIG. 4 is opened to enable entry of texts. When the SEND key is pressed, entered texts are taken into the creator 1.

When presentation materials are dragged from the file list ③ of the client PC 2 to the icon ② of a projector 4 on which the materials are desired to be displayed and dropped there, the presentation materials are transferred to a creator 3, so that the presentation materials selected from the file list is displayed on a screen of the projector 4. At the same time, the presentation materials and page turn-over information etc. are saved on a hard disk in the creator 1.

Figure 10:
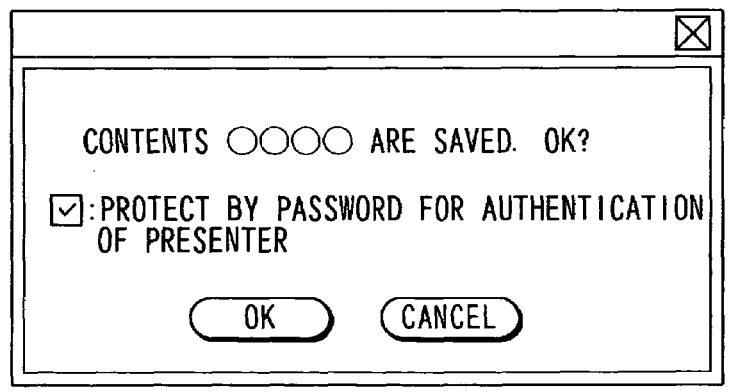
FIG. 10 is an illustration for showing a screen for confirming that contents have been saved.

At step S5, the STOP key ⑤ is pressed on the control screen in order to finish the recording operation. When the key is pressed, a saving confirmation screen such as shown in FIG. 10 is displayed at the clerical worker-side client PC 2. Contents other than the save processing are erased. When information is saved in such a manner, conference contents are created automatically at step S6. That is, at this step S6, conference contents are created on the basis of still picture information from the communicator 3 and moving picture/audio information from the moving picture/audio input apparatus 5. File data of the conference contents are converted into HTML-format file data so that the conference contents can be referenced through a network such as the Internet.

At step S7, when the conference contents are created completely, the creator contents manager screen is displayed, to enable the conference contents saved in the creator 1 to be confirmed (see FIG. 6).

At step S8, conference contents one wishes to view can be selected on this creator contents manager screen to reproduce its details. The contents whose details have been confirmed can be transferred to the server 6 and so saved (step S9).

Further, if one wishes to reproduce conference contents and edit its details at step S8, he or she can operate the creator contents manager screen at step S10 to transfer the conference contents to the client PC side to edit them using known edit software. Server contents after being edited are transferred to the server 6 and saved (step S9).

Figure 11:
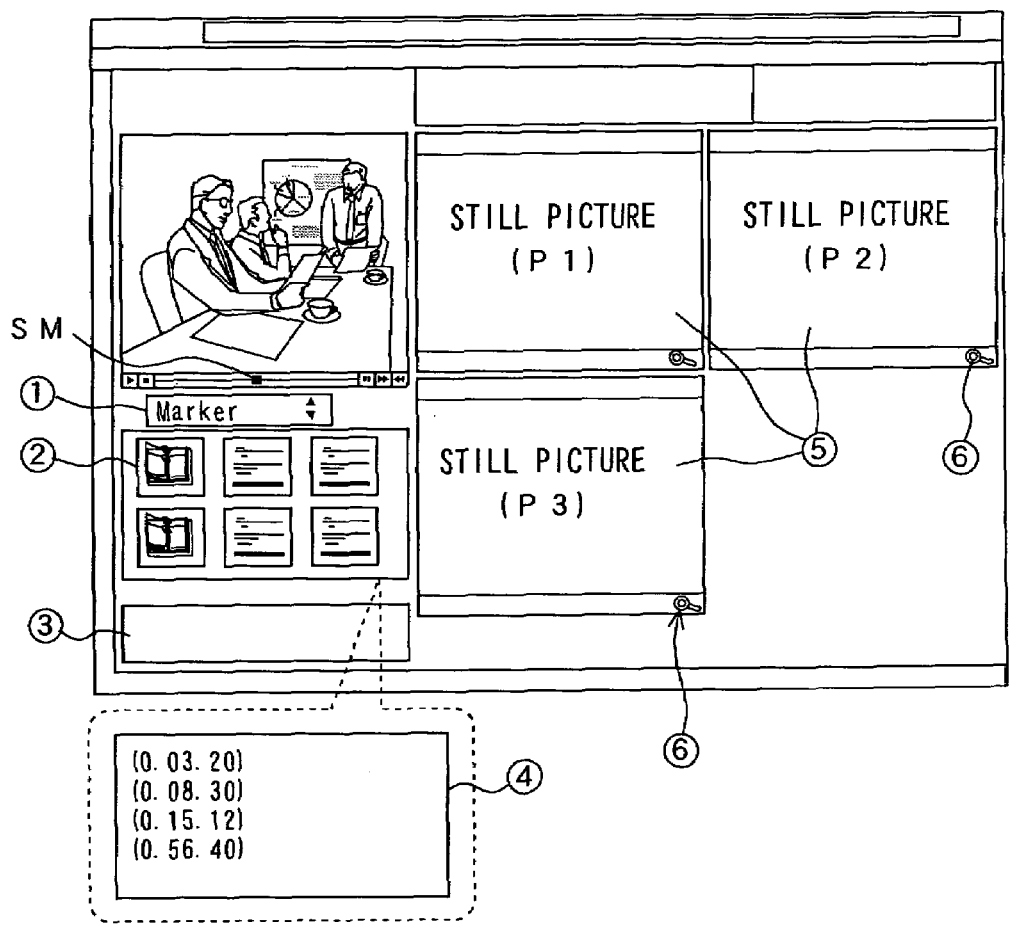
FIG. 11 is an illustration for showing a contents-reproducing screen.

At the client PC 2, who is a clerical worker, it is possible to reproduce the conference contents on the server 6 (step S11). FIG. 11 shows one example of contents-reproduction screen.

The contents-reproduction screen has such a screen configuration that, as shown in the figure, the screen is split into an upper left portion that shows a moving picture reproduction portion that video-records a condition of a conference and a right half portion that shows a still-picture reproduction portion that reproduces presentation materials, which is still picture information used in the conference, so that these portions can be displayed simultaneously on the same display screen.

Therefore, the still picture reproduction portion for reproduction of presentation materials varies in display pattern according to the maximum number of projectors that are installed in one conference room. In the present embodiment, up to three projectors can be connected in configuration, and thus, up to three sheets of presentation materials may be displayed in some cases, so that the still picture reproduction portion can be split into up to four parts in display pattern configuration of the reproduction screen.

This display pattern is given in templates, so that the display pattern templates (templates 1-3) are selected according to the number of projectors to be used. FIG. 11 shows a case where the template 3 of display pattern is employed when three projectors are used. A still picture P1 indicates materials ⑤ displayed by using a projector 4a and, similarly, still pictures P2 and P3 indicate the materials ⑤ displayed by using projectors 4b and 4c respectively. In reproduction of contents, as time passes by, the materials ⑤ displayed in this still picture reproduction portion are switched automatically. Details of the templates 1 and 2 of display patterns will be described later.

In the moving picture reproduction portion, there are displayed symbol marks that indicates only an image or audio of the above-mentioned conference as well as, directly below its image display portion, a mark SM having its horizontal axis (horizontal direction) as a reproduction time axis that indicates an image reproduction lapse of time.

By clicking on this mark SM with the mouse, this mark SM can be shifted (sought) to an arbitrary position on this reproduction time axis. To this sought position, the reproduction time axis for moving pictures is shifted, and from the reproduction time axis, normal reproduction of the moving pictures restarts, so that this mark SM functions also as a seeking mark.

In synchronization with the sought reproduction time axis, presentation materials, which are still picture information, are also reproduced. Therefore, such presentation materials as to match this reproduction time axis are displayed in a corresponding display area.

A display portion further below a display area of the mark SM is split into two parts, where up to six sheets of presentation materials displayed by the projectors are displayed in thumbnails. If a plurality of projectors is used, materials displayed on selected one of the projectors are displayed in thumbnails.

When an arbitrary one of the thumbnails is selected, a moving picture displayed above is synchronized with it and the thumbnail is shifted to a displayed time axis, so that its normal reproduction starts from that time axis.

This thumbnail display ② can be switched to the above-mentioned mark display ④. Switch-over between thumbnail display and mark display is selected at a View switch-over portion ①.

Titles ("Untitled" if no title is given) and times attached in edit processing are displayed in order in which the MARK key ⑦ on the control screen has been pressed during the conference. When a title in a mark display field ④ is clicked on with the mouse, the moving picture displayed above is also synchronized with this, to be shifted to its time axis, and its normal reproduction starts. With this, always the moving picture and the still picture (presentation material) are displayed in synchronization with each other. In reproduction, their displays are each switched as time passes by.

Below each of the display screens of the above-mentioned still picture reproduction portions, a display zoom-up key ⑥ is arranged so that when this is selected, a still picture being displayed may be switched into a maximum display pattern (original-size display) (see FIG. 16).

Figure 12A:
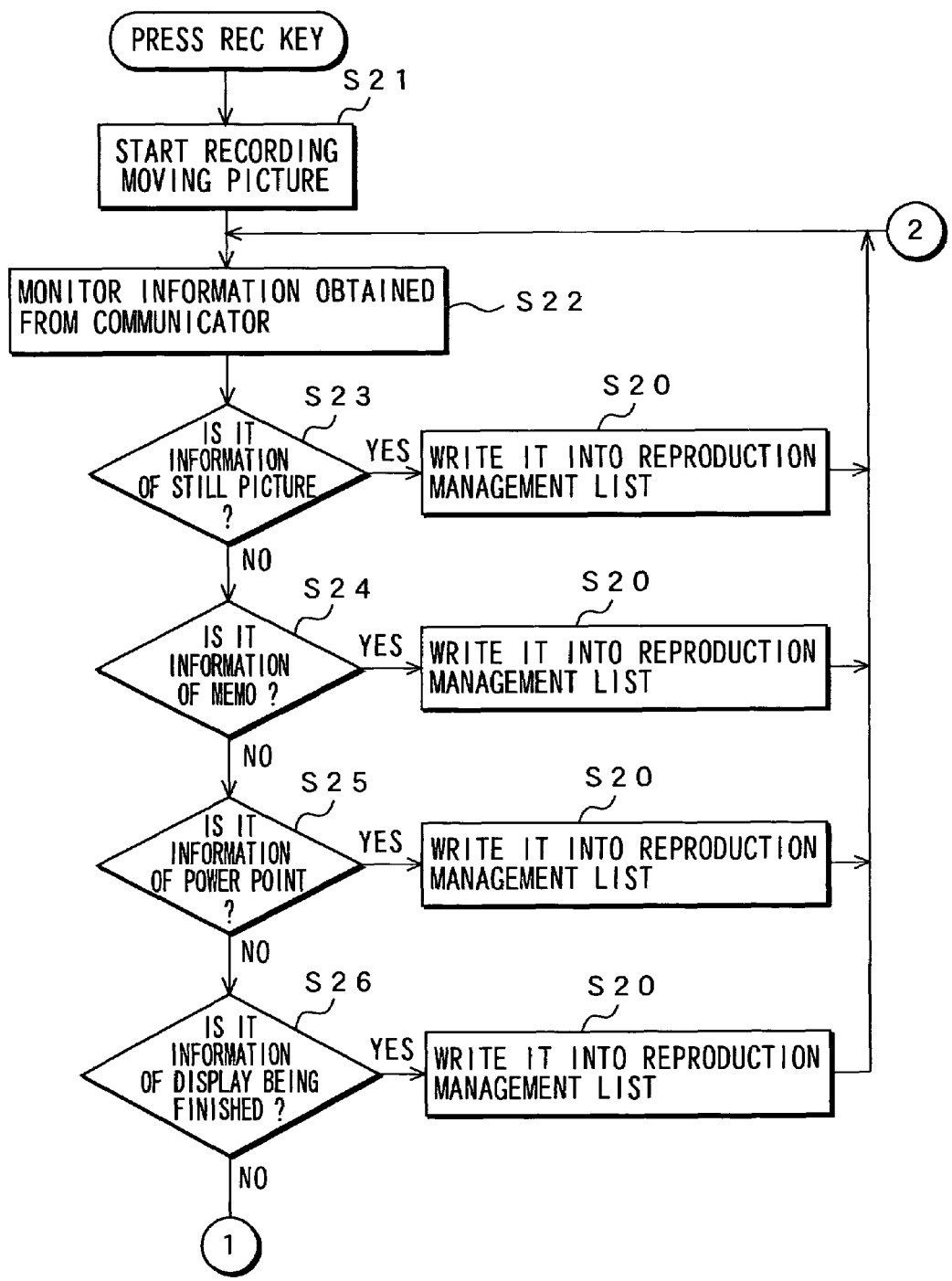

The following will describe recording operations of the creator 1 with reference to flowcharts of FIGS. 12A and 12B.

The creator 1 records moving pictures in accordance with a recording instruction from the client PC 2 and records and saves presentation information sent from the communicator 3. These presentation materials are supposed to include various data items such as still pictures themselves, materials created using material creating software (presentation software), for example, power point, sentence display files created in a portable document format (PDF), image data created in a graphic interchange format (GIF), and file data created using tabular software.

First, FIG. 12A is referenced. First, when the REC key ④ is pressed utilizing the control screen at the client PC 2, the creator starts recording a moving picture (step S21).

Next, at step S22, the creator monitors information from the communicator 3. This information is supposed to include capture key operation information such as information at the time of turn-over of a page of presentation materials which have been transferred as well as that at the time of change-over of the display screen by scrolling etc. with the page as un-turned over.

For example, FIG. 13 shows a case where if file data transferred as a presentation material is too much to be displayed entirely on the projector 4, first materials A of, for example, an upper half of the materials are displayed on the projector 4 (at a moment ta) and, at a next appropriate timing (moment tb), the screen is scrolled to display materials B of its lower half on the projector 4.

In such presentation, file information transferred first alone is not sufficient to determine which portion of the materials a presenter is actually using in explanation, so that the explanation and contents of the materials may mismatch. In such a case, therefore, preferably actual materials being displayed on the projector 4 are recorded as conference materials.

In such a case, preferably the clerical worker presses the "CAPTURE" key on the control screen to record presentation materials being displayed on the projector 4, so that such captured information transferred from the communicator 3 is also a piece of information which is to be monitored.

Next, at step S23, the creator checks attribute information for still picture information transferred from the communicator 3 and, if the attribute information is a still picture file, it describes in a management list (reproduction management list) attribute information to the effect that the attribute information is a still picture file (step S20).

Similarly, if the creator confirms that it is attribute information (text file) about a memo at step S24, it describes information to that effect in the reproduction management list (step S20) and, if it is attribute information about a file created by Power Point, the creator describes information to that effect (steps S25, S20).

If the input information is none of these, the creator decides that the attribute information indicates an end of display, and if it is display end information, the creator describes the information in the reproduction management list similarly (steps S26, S20).

When having finished deciding the attribute information in steps S20–S26 of FIG. 12A, the process subsequently goes to a step for deciding a type of still picture information itself. It is described with reference to FIG. 12B.

First, if the still picture information transferred at step S27 is a still picture file, the creator saves it in a corresponding folder (step S28).

If three projectors 4 are used in the electronic conferencing system, the creator copies a material (still picture file) used at the projector 4a into a P1 folder, a material (still picture file) used at the projector 4b into a P2 folder, and a material (still picture file) used at the projector 4c into a P3 folder.

By thus specifying a folder in which the materials are to be saved in accordance with the projector used in presentation, it is possible to reproduce and display a plurality of presentation materials simultaneously on a contents-reproduction screen by using a target display template when reproducing the conference contents.

Next, if it is decided to be a memo file at step S29, the creator saves this memo file in a memo folder (step S30). If the transferred still picture information is a Power Point file, the creator performs video compression on this Power Point file at step S32. As a compression format, for example, a JPEG format can be utilized which is oftenly used in a network such as the Internet. The creator gives a unique name to a new file thus converted into a JPEG file and saves it in an image folder (step S33). If it must wait in compression processing at step S32, the creator temporarily saves the file in a queue.

The creator repeats the above-mentioned processing of monitoring attribute information and saving it into a specific folder with a type of still picture information being determined, at a timing when information is input from the communicator 3 (step S22).

Note here that the attribute information sent from the communicator 3 described with reference to FIG. 12A may include the following:

A) Display page of Power Point (display starting time, page information at the time of page turn-over, projector No., etc.);

B) File name of JPEG file (including display starting time, projector No., etc.);

C) File name of GIF file (including display starting time, projector No.); and

D) All-display end.

Based on these items, a reproduction management list (database) is created.

FIG. 14 shows one example of the reproduction management list. In it, display starting time refers to a point in time when display of a still picture or a memo starts or a relative point in time as measured from the beginning of a moving picture.

A function code indicates the following:

11: A still picture is displayed at a still-picture display position (positions P1-P3 that correspond to the projectors 4a-4c respectively);

12: A memo is displayed on the memo screen;

13: Display of a still picture in the still picture display portions (P1-P3) is erased; and 14: Memo display is erased.

A file name refers to the name of a file to be displayed. If a Power Point file is converted into a JPEG file, it is assigned a name in, for example, the following format:

converted time_page number.jpg (converted time=YYYYMMDDhhmmss)

Subsequently, when the recording is finished, the moving picture/audio information and still picture information that have been recorded in such a manner are automatically reorganized into the conference contents which are used as proceedings of the conference. The conference contents are created as contents that can be retrieved and viewed by Web Viewer. This is described with reference to FIGS. 15A and 15B below.

Figure 15A:
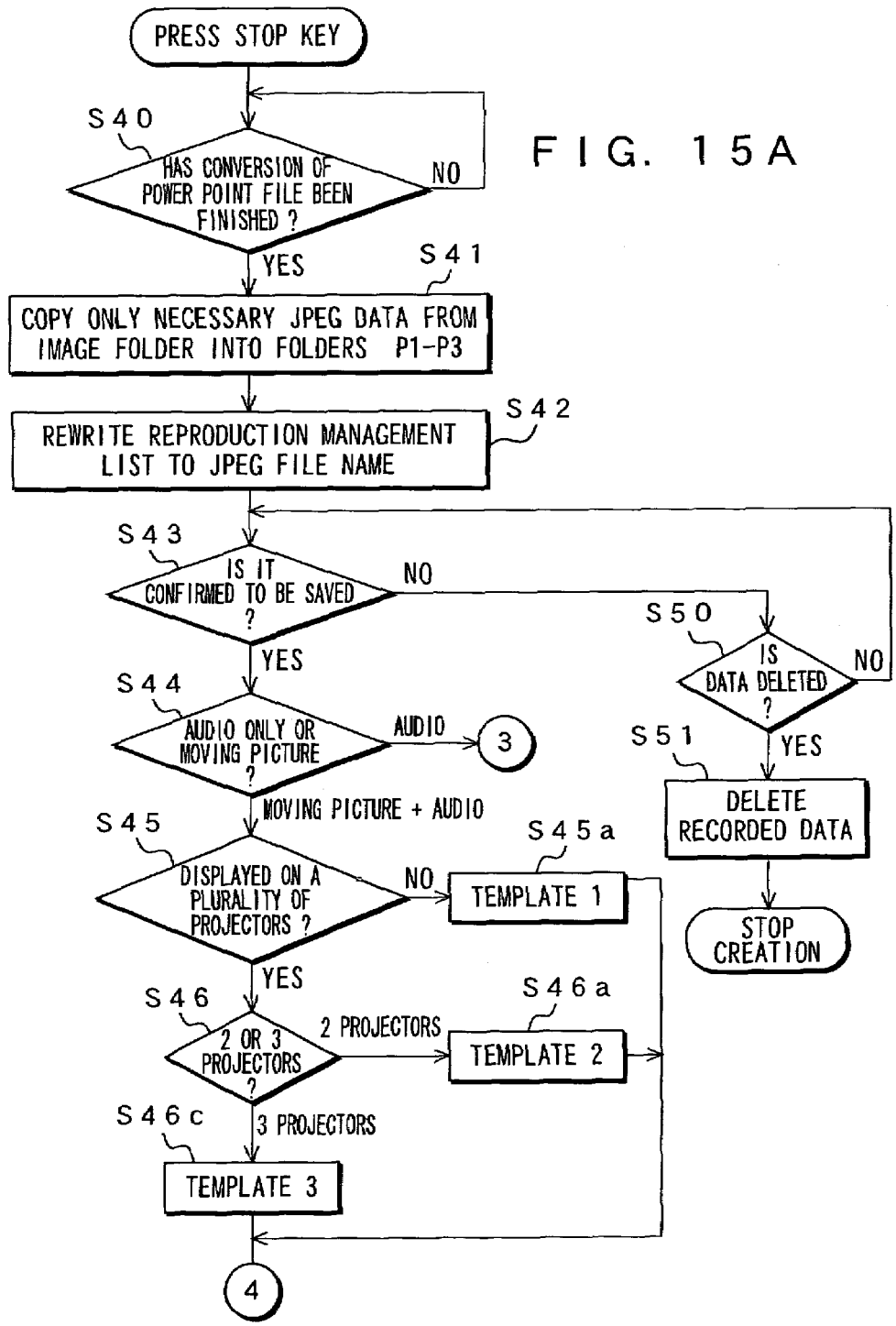
FIGS. 15A and 15B are flowcharts of contents-creating operations by the creator.

FIGS. 15A is a flowchart of contents-creating operations. To finish recording on the side of the creator 1, press the STOP key ⑤ on the control screen. When the recording is finished, simultaneously, contents-creating processing starts, so that, if there is present a Power Point file, first the process confirms that this file has been converted into a JPEG file (step S40).

When conversion into the JPEG file is finished, the process copies only necessary JPEG data from the image folder to a corresponding one of the folders P1-P3 at step S41. This is done so in order to copy a JPEG-converted file also into the same folder if the same projector has been used.

At step S42, the process rewrite a file name of the reproduction management list to a JPEG file name and gives an extension to it. At the next step S43, the process checks whether it is to be saved as conference contents (see FIG. 10).

If an instruction is received to the effect of not to save at step S50, the process checks whether the file data should be removed entirely and, if such is the case, deletes all data recorded at step S51 and stops the contents-creating processing.

If processing to save the file is selected, on the other hand, the process checks whether information sent from the moving picture/audio input apparatus 5 of data saved at step S44 includes audio only or both of a moving picture and audio (step S44). This check is performed because processing to be performed is different between a case where it includes audio only and a case where it includes both a moving picture and audio.

The case where it has both of a moving picture and audio is described first as follows: in this case, the process checks the number of the projectors used in presentation at step S45. If more than one projector is used not, that is, one projector has been used, the process selects contents-displaying template, that is, the template 1 as a display pattern (step S45a).

If two projectors are used, the process selects the display template 2 (steps S46, S46a) and, when they are used three, the process selects the display template 3 (steps S46, S46c).

By thus selecting a display template in accordance with the number of projectors 4 used and reproducing and displaying it as contents-screen, it is possible to always reproduce and display presentation materials for the number of projectors used simultaneously with moving pictures no matter how many of them are used. As a result thereof, it is possible to surely get rid of such an improper problem that when the projectors are used more than one simultaneously for presentation, presentation materials used on some of these projectors cannot be reproduced.

Figure 16:
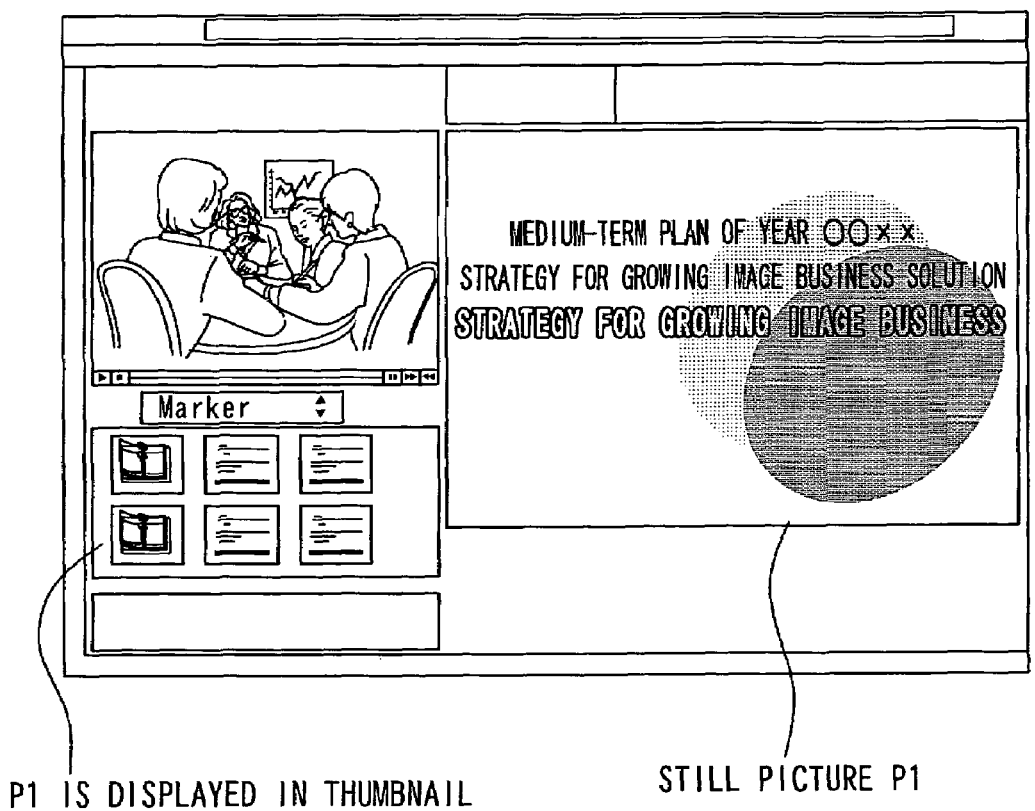
FIG. 16 is an illustration for showing a display pattern which uses a template in a case where one projector is used.
Figure 17:
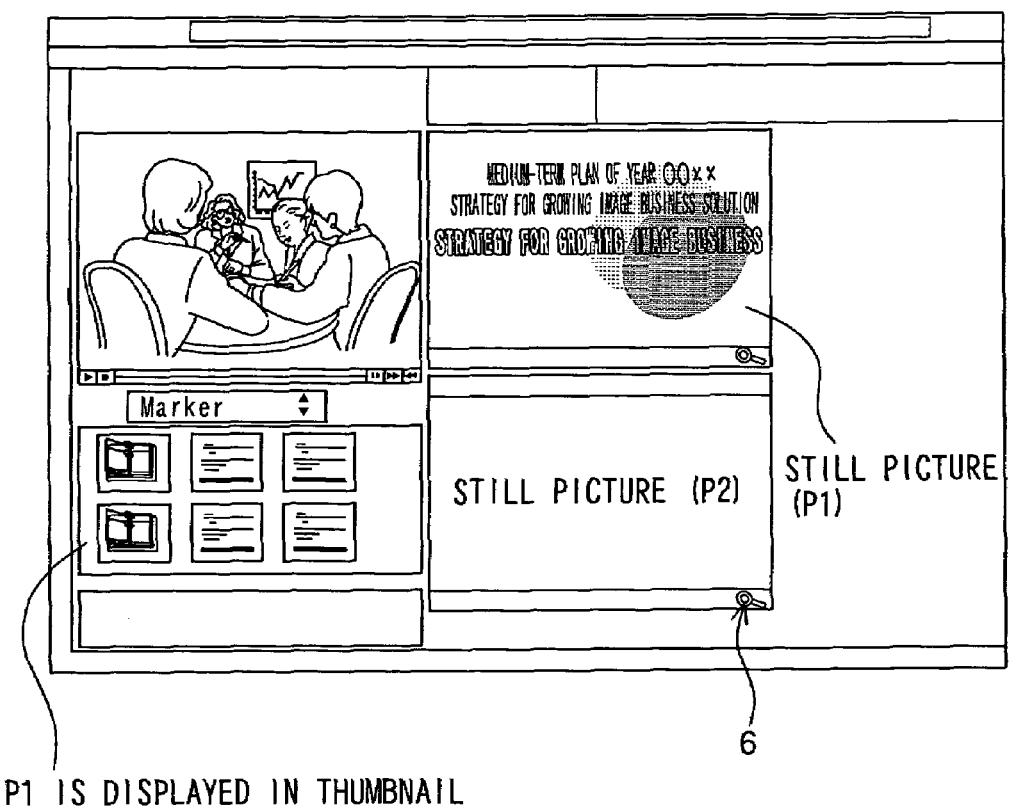
FIG. 17 is an illustration for showing a display pattern which uses a template in a case where two projectors are used.

Note here that a display size employed in the still picture reproduction portion in a case where the template 1 is selected as the display template becomes the largest one of display sizes, one example of which is shown in FIG. 16. If the template 2 is selected, on the other hand, still picture information from the two projectors are to be displayed simultaneously on the screen, so that as shown in FIG. 17 they are displayed one above the other. Therefore, the display size becomes a little smaller. If three projectors are used, such a display pattern as shown in FIG. 11 is employed. FIG. 11 gives a display example in a case where an aspect ratio of the screen is 4:3. Incidentally, in the present embodiment, the smallest display size comprises 320 by 240 pixels.

Figure 15B:
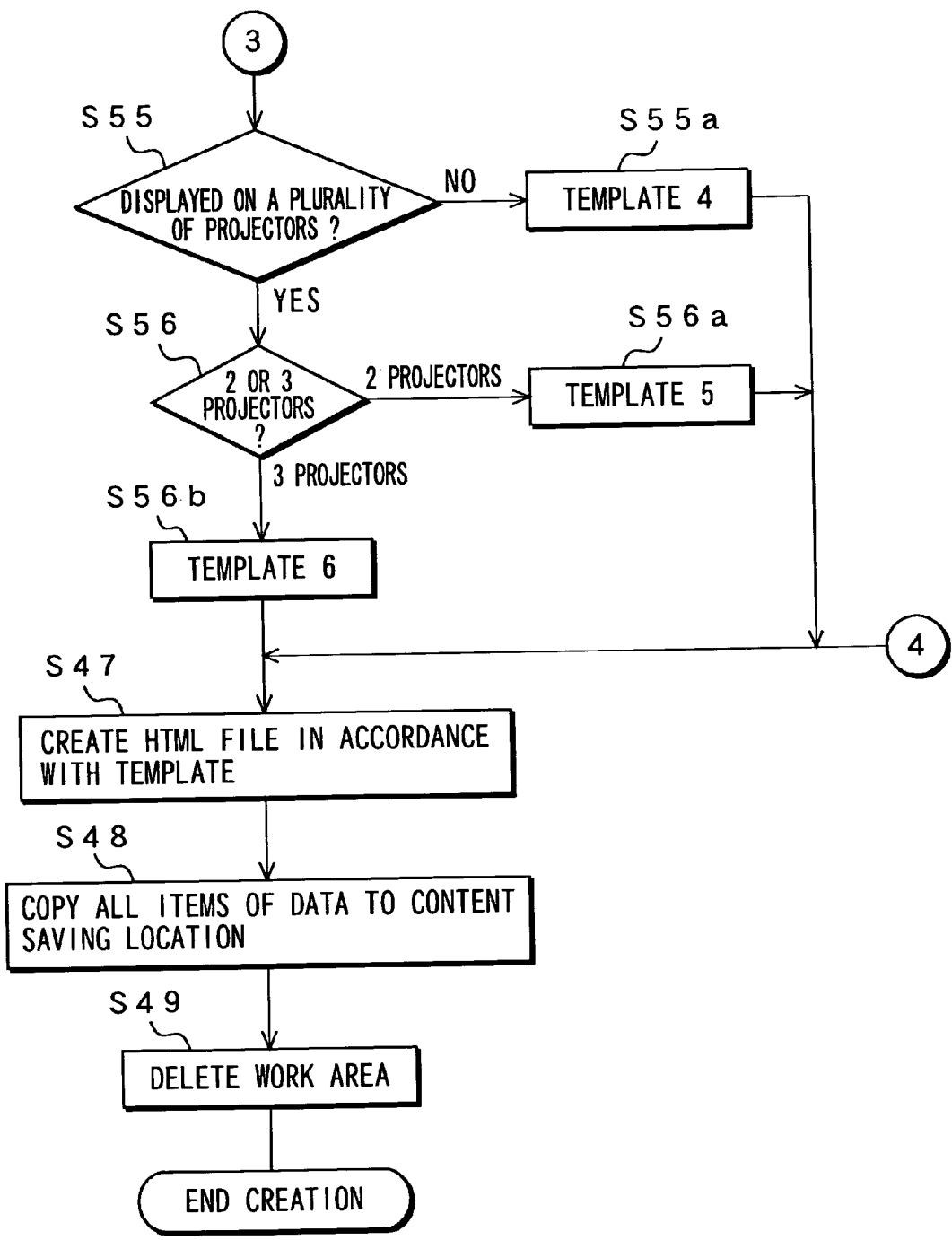
Figure 18:
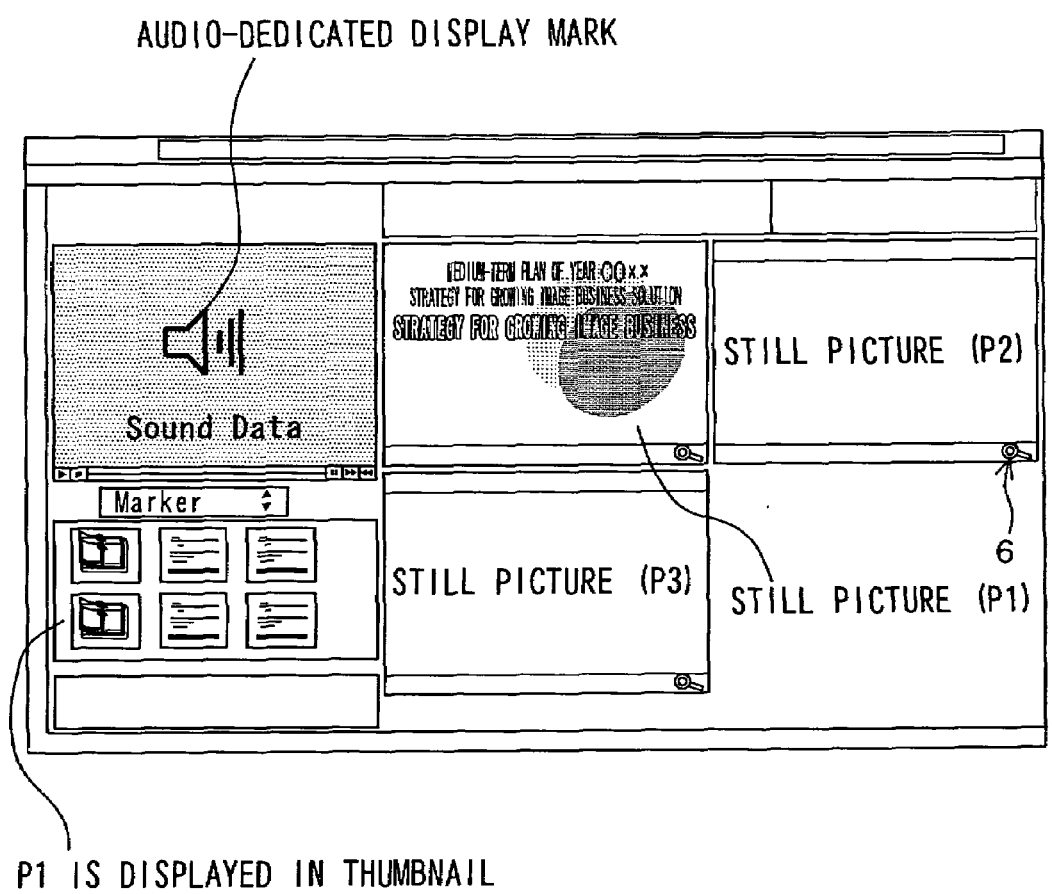
FIG. 18 is an illustration for showing a display pattern which uses a template in a case where three projectors are used only for audio.

Next, as indicated by step S47 in FIG. 15B, before an HTML file is created in accordance with the selected template, processing in the case where the data includes audio only is also performed. In the case where the data consists of audio only, only a symbol mark indicating audio only is displayed in place of an image of the conference in the moving picture reproduction portion and one of the templates is selected in accordance with the number of the projectors to be used. Therefore, aspects of the templates selected at steps S55, S55a, S56, S56a, and S56b are the same as that in a case where the data includes both a moving picture and audio and their detailed description is omitted. Note here that the template 4 corresponds to the template 1 and the templates 5 and 6 correspond to the templates 2 and 3, respectively. Incidentally, one example of a reproduction screen of a content in a case where three projectors are used is shown in FIG. 18.

The data including a moving picture and audio or an audio only for which a display template has been determined is converted into an HTML file in a condition where it matches this template, at step S47.

At the next step S48, all items of the data, that is, the moving picture/audio data as well as JPEG data in the reproduction management list, still picture file data (JPEG data), JPEG data in the power point file, and text data are all copied to a contents-saving location. Then, the process deletes a work area which has been reserved on a hard disk 1b, which is a working memory of the creator 1, and finishes the automatic conference contents creation processing (step S49).

Figure 19A:
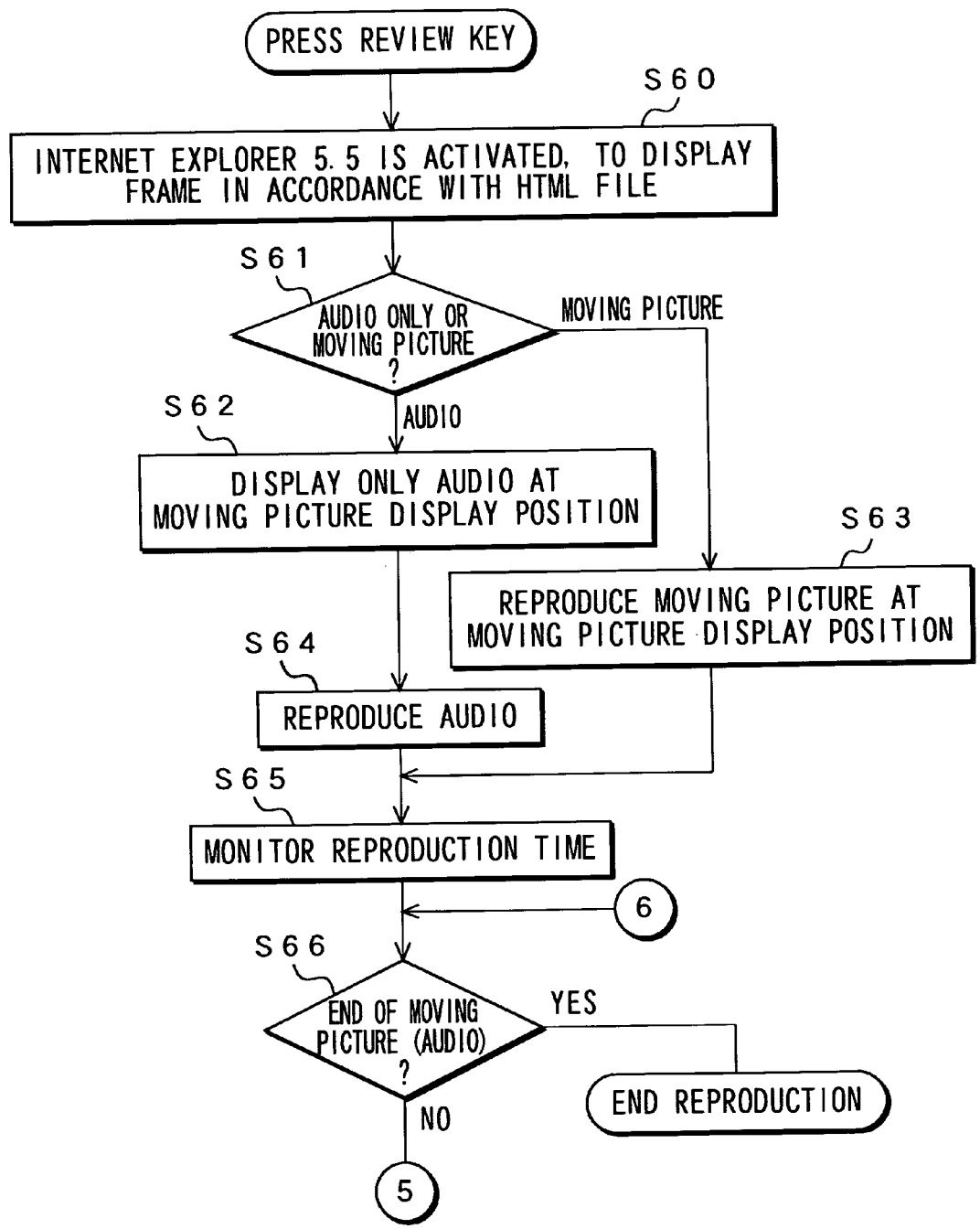
FIGS. 19A and 19B are flowcharts of contents-reproducing operations by the creator.
Figure 19B:
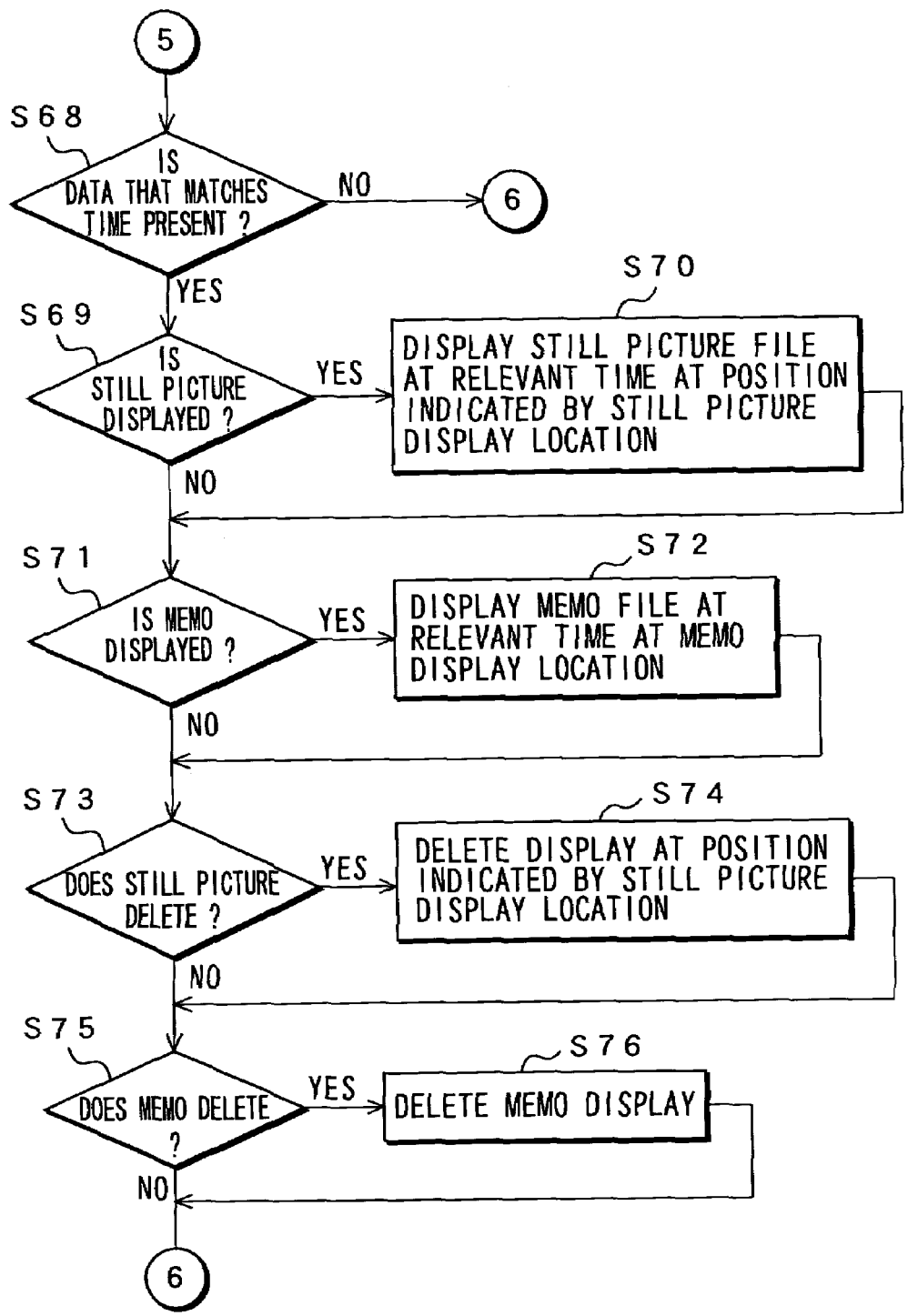

The following will describe conference contents reproducing operations with reference to flowcharts of FIGS. 19A and 19B.

A menu is selected and the creator contents manager screen shown in FIG. 6 is opened. Then, when conference contents desired to be viewed are instructed and the Review key ② is pressed, Web browser (e.g., Internet Explorer) is activated, so that details of files are displayed in frame units in accordance with the HTML file (step S60).

If the data includes audio only at step S61, the process displays the symbol mark indicating audio only at a moving picture display position at step S62 (see FIG. 19A). Then, the process reproduces the audio (step S64). If the data includes a moving picture, the process reproduces the moving picture (conference image) at the moving picture display position at step S63.

Then, the process monitors reproduction time at step S63 and, if reproduction of the moving picture or audio is yet to be at the end (step S66), checks whether there is still picture information (HTML-format file data) that matches this reproduction time as shown in FIG. l9B (step S68).

In a case where there is file data that matches reproduction time of a moving picture etc. and if it is a still picture file, the process displays a still picture file of the relevant time in a specified one of the display areas P1-P3 (steps S69, S70). If the file data is a text file (memo information), the process displays it in the memo display area at the relevant time (step S72).

Further, the process monitors not only display of the screen but also its erasure. If the reproduction management list includes information for erasure of a still picture or memo, the process monitors when time for the erasure comes and, when the time has come, erases display at its display position if it is a still picture (steps S73, S74). If it is a memo, the process performs processing for erasing display at its display position (steps S75, S76).

The process performs such display check processing and the erasure check processing until reproduction of a moving picture or audio is finished (step S66) and, when it is finished, ends the conference contents reproduction processing mode.

In the flowchart shown in FIGS. 19A and 19B, if the zoom-up key is pressed when still picture information is being reproduced and displayed on the screen, the process zooms up an image at which the zoom-up key has been pressed. If it is displayed as shown in FIG. 11, presentation materials being displayed on all of the projectors can be viewed but these presentation materials are not displayed in such a size that their details can also be confirmed. In such a case, this zoom-up function is employed to zoom in materials (which may be past ones) actually being presented.

In this case, the flowchart shown in FIG. 19B is added the following processing. Therefore, the processing of FIG. 20 is performed from a moment of completion of decision at step S75 of FIG. 19A to step S66 shown in FIG. 19B.

Figure 20:
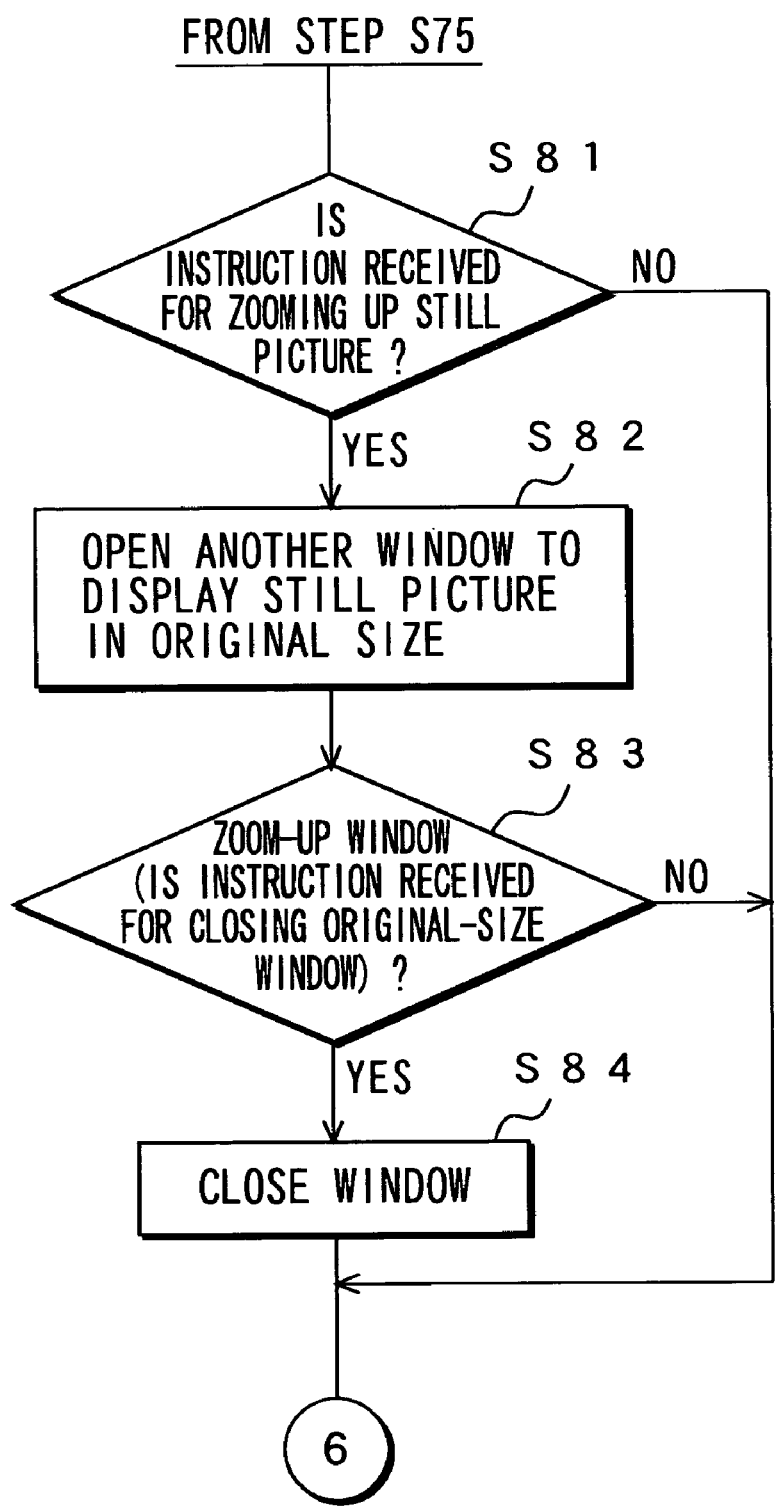
FIG. 20 is a portion of a flowchart of zoom-up operations.

If a zoom-up instruction for a still picture being reproduced and displayed is received as shown in FIG. 20 (step S81), another window is opened to display the still picture in an original size (step S82). Of course, the still picture can be displayed also by changing the display template for determining a display pattern to the template 1.

Then, the process checks whether an instruction for closing a zoom-up window (original size window) is received (step S83) and, if such is the case, performs processing for closing the window (step S84). With this, original display is recovered.

If the instruction for closing the window is not received, on the other hand, the process continues zoomed-up display. Therefore, if a still picture to be displayed at the same position is switched in this condition, an updated still picture is zoomed up similarly.

If a normal reproduction instruction is received, the process recovers the original template and displays the still picture (step S84). It is thus possible to select an arbitrary still picture whose details are desired to be checked and zoom it up.

Further, if the mark SM displayed on the contents reproduction screen shown in FIG. 11 is clicked on and sought, as described above, a moving picture is normally reproduced starting from a point in time when the seeking is finished, in synchronization with which the presentation materials are also displayed at a corresponding display position.

Figure 21:
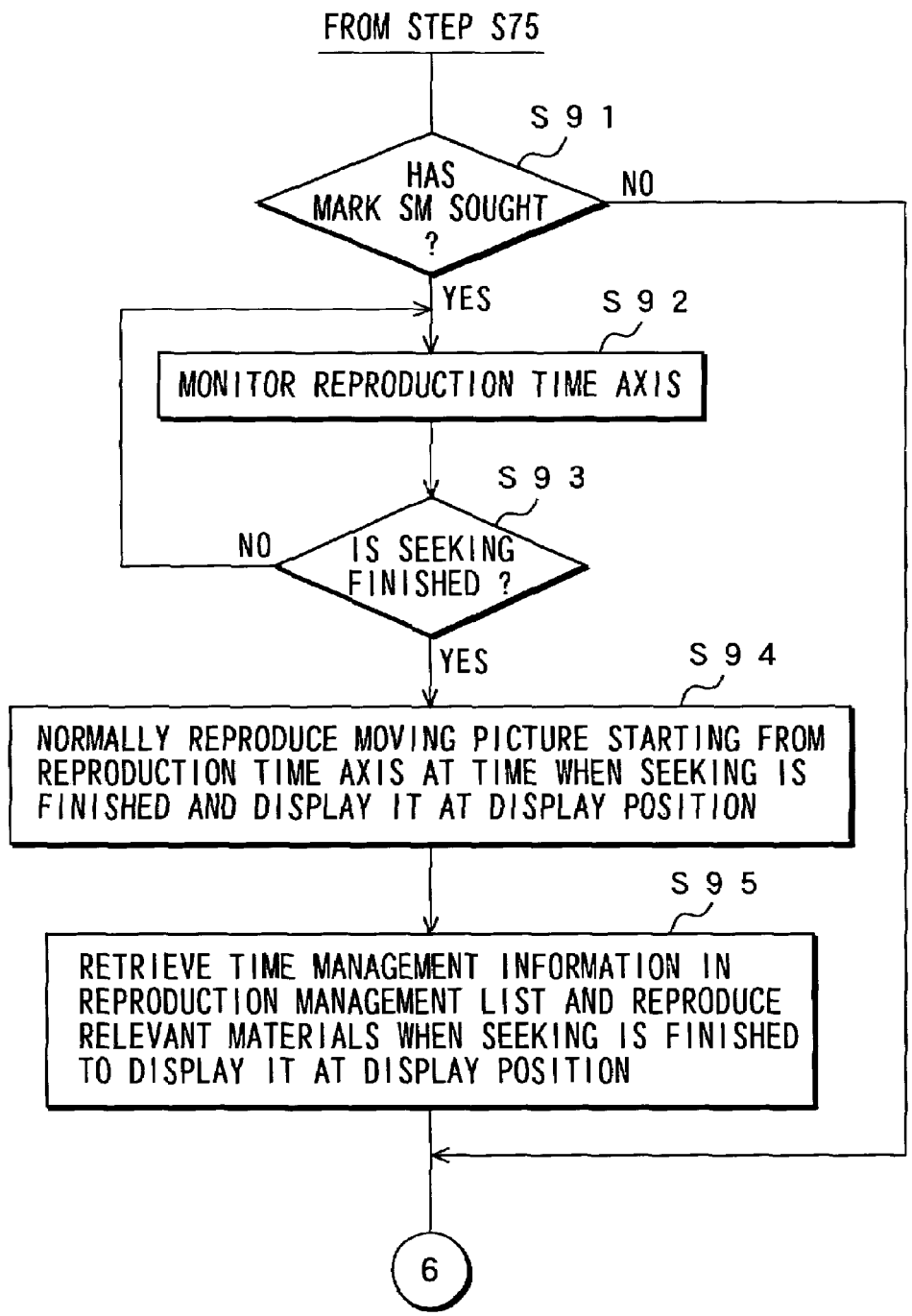
FIG. 21 is a portion of a flowchart of a seeking processing example.

The following will describe one example of such synchronous reproduction processing with reference to a flowchart of FIG. 21. A procedure for this processing can be inserted between, for example, step S75 of FIG. 19B for monitoring of the memo erasure processing and processing step S66 of FIG. 19A. If a processing procedure for FIG. 20 is present, after this processing procedure is finished, a processing procedure for FIG. 21 can be inserted.

First, the process monitors the mark SM at step S91 and, if the mark SM is clicked on, monitors a seeking-finished timing with the reproduction time axis being checked (steps S92, S93). A moving picture is reproduced normally starting from such a reproduction time axis that the seeking is finished (step S94).

During a seeking period, the process always collates to each other sought reproduction time information and time management information about presentation materials recorded in the reproduction management list and retrieves the presentation materials that match management information at the time when seeking is finished and, if such presentation material is found, it selects the presentation materials as reproduction information at the time after seeking is finished (step S95).

If the seeking-finished timing is between time for starting display of certain presentation materials and that of the next presentation materials, the presentation materials of the first display starting time are selected as presentation materials to be reproduced.

If, for example, the seeking-finished reproduction time is 00:05:00 and there are found two presentation materials that have display starting time points of the corresponding time management information of 00:04:00 and 00:07:00 respectively, the process selects the first presentation materials that have the display starting time of 00:04:00 as reproduction-subject presentation materials and reproduces and displays it.

In such a manner, even if the mark SM is shifted to any position on the reproduction time axis, presentation materials synchronized with the relevant moving picture can be reproduced and displayed for sure. That is, it is possible to get rid of such a problem that presentation materials cannot be updated in synchronization with a moving picture depending on a sought position.

Although the present invention has been applied to a network electronic conferencing system in the above-mentioned embodiment, the present invention is not limited to it. For example, the present invention can also be applied similarly to a network education system, a network game system, etc. as described at the beginning of the present description.

As described above, according to the present invention, in recording both moving picture/audio information and still picture information, if the still picture information is being displayed on a plurality of displays, the information being displayed on all of the displays is recorded and a reproduction management list of still picture information corresponding to the moving picture/audio information is created so that this reproduction management list can be utilized to reorganize contents or manage a display pattern for reproduction processing.

In such a manner, besides a feature that moving picture/audio information and still picture information which has been used in presentation can be managed in the same dimension, it is possible to chronologically grasp from the reproduction management list when and in which file name the information has been displayed on each of the displays. Therefore, even in a case where contents represented in an HTML format etc. are reproduced, it is possible to select a display pattern in which pieces of information are to be reproduced easily on the same screen, thus displaying pieces of still picture information one and all on a split screen as inserted therein.

It is thus possible to eliminate such a problem that only specific still picture information is reproduced and to reproduce a condition close to an actually held conference. Therefore, the present invention features that in the case of a network conference etc., presentation materials being used at all video projectors can be split and displayed on the same screen simultaneously, thus creating and displaying conference contents without lacking any presentation materials.

By the present invention, since one piece of still picture information being displayed on a display screen can be zoomed up, it is possible to view its contents easily and improve visibility Further, by the present invention, when moving picture/audio information is being reproduced in the seeking mode, still picture information related to moving picture/audio information being sought can be retrieved and reproduced with collating to each other reproduction time information attached to this moving picture/audio information and time management information included in a reproduction management list, so that even if the moving picture/audio information has been sought to an arbitrary point in time, still picture information related to moving picture/audio information at the time when the seeking is finished can be retrieved, thereby reproducing and displaying corresponding still picture information immediately when the seeking is finished. Therefore, the present invention features that there is always established correspondence between moving picture/audio information and still picture information.

Furthermore, by the present invention, still picture information is automatically recorded in synchronization with moving picture/audio information and, according to a capture instruction, still picture information being actually displayed on a relevant display is recorded, so that captured pieces of still picture information are displayed in chronological order in which they have been captured, thus enabling reproduction of information in line with an actual conference. Therefore, the present invention features that reproduction contents having realistic sensations to the fullest can be created.

INDUSTRIAL APPLICABILITY

The present invention is extremely well applicable to a network conferencing system, a network education system, a network game system, etc. for utilizing a network to thereby hold a conference, give classes or lectures, play games, etc. respectively.

The invention claimed is:

1. An information creating method comprising the steps of:
   recording moving picture/audio information obtained from a moving picture/audio input apparatus connected to a network;
   recording still picture information displayed on a plurality of displays connected to said network; and
   when said still picture information is recorded, creating a reproduction management list of said still picture information that corresponds to said moving picture/audio information,
   wherein the reproduction management list includes at least a list name of said still picture information supplied to said displays, time management information for managing display-starting time and display-finished time of said still picture information on said displays, and identification information for identifying a displays status of the still picture information,
      wherein the displays status indicates display position of the still picture information and display or erasure of the still picture information.

2. The information creating method according to claim 1, wherein when recording of said moving picture/audio information and said still picture information is finished, these pieces of information are reorganized as contents in which these pieces of information are reproduced via a network, by using said reproduction management list.

3. The information creating method according to claim 2, wherein when said displays are connected to more than one said network, said contents are compressed information obtained by converting each of said moving picture/audio information, said still picture information, and said reproduction management list into an HTML format.

4. The information creating method according to claim 2, wherein said contents are configured to reproduce and display said moving picture/audio information and said still picture information on the same monitor screen simultaneously.

5. An information creating apparatus comprising:
   information recording means for recording information supplied via a network;
   reproduction list creating means for creating a reproduction management list at the time of information reproduction based on the information supplied via said network;
   contents-creating means for reorganizing said information as contents in which said information is reproduced via a network, using said reproduction management list; and
   control means for controlling each of said information recording means, said reproduction list creating means, and said contents-creating means,
   wherein the reproduction management list includes at least a list name of still picture information supplied to a plurality of displays, time management information for managing display-starting time and display-finished time of said still picture information on said displays, and identification information for identifying a displays status of the still picture information,
      wherein the displays status indicates display position of the still picture information and display or erasure of the still picture information.

6. The information creating apparatus according to claim 5, wherein information supplied via said network comprises moving picture/audio information from a moving picture/audio input apparatus and still picture information displayed on a display.

7. A network information processing system comprising:
   at least one information processor having an input operation function and processing arbitrary information;
   a plurality of displays for displaying images based on at least information transferred from said information processor;
   an information processing assisting apparatus for assisting network information processing including display processing in said display based on an input operation instruction from said information processor;
   communication means for connecting said information processing assisting apparatus and said information processor to each other;
   a moving picture/audio input apparatus for inputting an image and audio other than the information that is transferred from said information processor; and
   an information creating apparatus for recording information transferred from said information processor and said moving picture/audio input apparatus in accordance with an instruction from said information processor and reorganizing this information as contents communicated via a network,
   wherein said information creating apparatus includes:
      information recording means for recording information supplied via said network;

reproduction list creating means for creating a reproduction management list at the time of information reproduction based on the information supplied via said network;

contents-creating means for reorganizing said information as contents in which said information is reproduced via said network, using said reproduction management list; and control means for controlling each of said information recording means, said reproduction list creating means, and said contents-creating means, wherein the reproduction management list includes at least a list name of still picture information supplied to said displays, time management information for managing display-starting time and display-finished time of said still picture information on said displays, and identification information for identifying a displays status of the still picture information, wherein the displays status indicates display position of the still picture information and display or erasure of the still picture information.

8. The network information processing system according to claim 7, wherein said communication means is of any one of a wire system and a wireless system.

9. The network information processing system according to claim 7, wherein said information processing assisting apparatus and said information creating apparatus are connected to said network.

10. The network information processing system according to claim 7, wherein on a display surface of said information processor, information reproduced by said information creating apparatus from said moving picture/audio input apparatus and information displayed on said display are transferred and simultaneously displayed.

11. An information creating method comprising the steps of:

when recording multiple pieces of still picture information displayed on a plurality of displays in synchronization with moving picture/audio information from a moving picture/audio input apparatus and editing the recorded pieces of information for reproduction thereof, selecting a display pattern of reproduction-screen in accordance with the number of said displays to reproduce and display said multiple pieces of still picture information on the same screen simultaneously; and zooming up and reproducing one piece of said still picture information displayed in said display pattern by instructing an icon displayed in said display pattern.

12. The information creating method according to claim 11, comprising the step of reproducing and displaying said moving picture/audio information on said display screen simultaneously.

13. The information creating method according to claim 11, wherein in said display pattern selecting step, said display pattern has four display patterns in each of which a display area can be split into up to four portions; and wherein said four display patterns are selected in accordance with the number of said displays used.

14. The information creating method according to claim 11, wherein if an instruction is received for zooming up said still picture information being reproduced in synchronization with said moving picture/audio information, as said display pattern, the largest display pattern is selected which is used when displaying said still picture information using one display.

15. The information creating method according to claim 11, wherein if said still picture information is updated in a condition where said still picture information is zoomed up, updated still picture information is zoomed up.

16. The information creating method according to claim 11, wherein said moving picture/audio input apparatus is a video camera and said display is a video projector.

17. An information creating apparatus comprising:

information recording means for recording each of moving picture/audio information from a moving picture/audio input apparatus and still picture information from a plurality of displays;

reproduction management list creating means for listing attribute information about multiple pieces of input still picture information;

organizing means for reorganizing said moving picture/audio information and said still picture information with a display pattern in which said multiple pieces of still picture information are displayed on a display screen simultaneously being selected, based on attribute information from said reproduction management list creating means; and control means for controlling said plurality of means.

18. The information creating apparatus according to claim 17, wherein said reproduction management list includes identification information for identifying said displays that have displayed said still picture information, time management information including display-starting time information, a file name of said still picture information.

19. The information creating apparatus according to claim 17, wherein said attribute information is identification information for identifying said displays.

20. The information creating apparatus according to claim 19, wherein said display patterns are selected in accordance with said identification information.

21. The information creating apparatus according to claim 19, wherein if an instruction is input for zooming up said still picture information being reproduced in synchronization with said moving picture/audio information, as said display pattern, the largest display pattern is selected which is used when displaying said still picture information by using one display.

22. Another network information processing system comprising:

at least one information processor having an input operation function and processing arbitrary information;

a plurality of displays for displaying images based on at least information transferred from said information processor;

an information processing assisting apparatus for assisting network information processing including display processing in said display based on an input operation instruction from said information processor;

communication means for connecting said information processing assisting apparatus and said information processor to each other;

a moving picture/audio input apparatus for inputting an image and audio other than the information transferred from said information processor; and an information creating apparatus for recording information transferred from said information processor and said moving picture/audio input apparatus in accordance with an instruction from said information processor and reorganizing it as contents communicated via a network, wherein said information creating apparatus includes:

information recording means for recording each of moving picture/audio information from said moving picture/audio input apparatus and still picture information from said plurality of displays;

reproduction management list creating means for listing attribute information about multiple pieces of input still picture information;

organizing means for reorganizing said moving picture/audio information and said still picture information with a display pattern in which said multiple pieces of still picture information are displayed on a display screen simultaneously being selected, based on the attribute information from said reproduction management list creating means; and control means for controlling said plurality of means.

23. The network information processing system according to claim 22, wherein said communication means is of any one of a wire system and a wireless system.

24. The network information processing system according to claim 22, wherein said information processing assisting apparatus and said information creating apparatus are connected to said network.

25. The network information processing system according to claim 22, wherein moving picture/audio information reproduced by said information creating apparatus from a moving picture/audio input apparatus and still picture information displayed on said display are transferred and simultaneously displayed on a display surface of said information processor.

26. The network information processing system according to claim 22, wherein if a plurality of said displays is included, according to a split-display pattern in accordance with the number of said displays, said still picture information is displayed on said display screen simultaneously.

27. The network information processing system according to claim 22, wherein if an instruction is input for zooming up said still picture information from said information processor, as said display pattern, the largest display pattern is selected which is used when displaying said still picture information by using one display.

28. The network information processing system according to claim 27, wherein if said still picture information is updated in a condition where said still picture information is zoomed up, updated still picture information is zoomed up.

29. An information creating method comprising the steps of:

when recording pieces of still picture information displayed on a plurality of displays together with a reproduction management list in synchronization with moving picture/audio information from a moving picture/audio input apparatus and reproducing these pieces of the recorded information, selecting a display pattern of a reproduction screen in accordance with the number of said displays to reproduce and display said multiple pieces of still picture information on the same screen simultaneously;

reproducing said moving picture/audio information and said still picture information in chronological order in which they have been recorded;

when said moving picture/audio information is being reproduced in a seeking mode, collating reproduction time information attached to this moving picture/audio information and time management information included in said reproduction management list to each other, to retrieve still picture information that matches reproduction time of said moving picture/audio information when said seeking-operation is finished; and reproducing said retrieved still picture information.

30. The information creating method according to claim 29, wherein said reproduction management list includes display-starting time for said still picture information recorded as time management information as well as identification information for indicating which display has been used to display said still picture information, a file name of said still picture information.

31. A network information processing system comprising:

at least one information processor having an input operation function and processing arbitrary information;

a plurality of displays for displaying images based on at least information transferred from said information processor;

an information processing assisting apparatus for assisting network information processing including display processing in said display based on an input operation instruction from said information processor;

communication means for connecting said information processing assisting apparatus and said information processor to each other;

a moving picture/audio input apparatus for inputting an image and audio other than the information transferred from said information processor; and an information creating apparatus for recording the information transferred from said information processor and said moving picture/audio input apparatus in accordance with an instruction from said information processor and reorganizing this information as contents communicated via a network, wherein said information creating apparatus includes:

information recording means for recording each of moving picture/audio information from said moving picture/audio input apparatus and still picture information from said plurality of displays;

reproduction management list creating means for listing attribute information about multiple pieces of input still picture information;

organizing means for reorganizing said moving picture/audio information and said still picture information with a display pattern in which said multiple pieces of still picture information are displayed on a display screen simultaneously being selected based on the attribute information from said reproduction management list creating means; and control means for controlling said plurality of means; and wherein when a seeking instruction about said moving picture/audio information is input, said control means allowing for retrieving the time management information in said reproduction management list on the basis of reproduction time information attached to said moving picture/audio information reproduced by said information recording means, to reproduce still picture information that matches reproduction time of said moving picture/audio information when said seeking-operation is finished.

32. The network information processing system according to claim 31, wherein said communication means is of any one of a wire system and a wireless system.

33. The network information processing system according to claim 31, wherein said information processing assisting apparatus and said information creating apparatus are connected to said network.

34. The network information processing system according to claim 33, wherein information reproduced by said information creating apparatus from a moving picture/audio input apparatus and information displayed on said display are transferred and simultaneously displayed on a display surface of said information processor.

35. The network information processing system according to claim 33, wherein said seeking mode is instructed by said information processor.

36. The network information processing system according to claim 33, wherein a soft key for instructing seeking is displayed on a display screen of said information processor, and in accordance with seeking time, its time axis moves.

37. An information creating method comprising the steps of:
recording still picture information transferred to a plurality of displays at a timing when it is transferred to said displays, in synchronization with moving picture/audio information from a moving picture/audio input apparatus; and
recording still picture information displayed on said displays among the pieces of said transferred still picture information, in accordance with a capture instruction,
wherein said still picture information to be captured comprises a specified page displayed with scrolling of the still picture information displayed by scrolling and still picture information at the time when a specified page is displayed.

38. The information creating method according to claim 37, comprising the steps of:
when recording multiple pieces of still picture information displayed on a plurality of displays in synchronization with moving picture/audio information from a moving picture/audio input apparatus and reproducing these pieces of recorded information, selecting a display pattern of reproduction screen in accordance with the number of said displays to display said multiple pieces of still picture information on the same screen simultaneously; and
reproducing said still picture information and said captured still picture information in chronological order in which they have been recorded.

39. An information creating apparatus comprising:
information recording means for recording each of moving picture/audio information from a moving picture/audio input apparatus and still picture information from a plurality of displays;
reproduction management list creating means for listing attribute information about multiple pieces of input still picture information;
organizing means for reorganizing said moving picture/audio information and said still picture information with a display pattern in which the multiple pieces of said still picture information are displayed on a display screen simultaneously being selected, based on the attribute information from said reproduction management list creating means; and
control means for controlling said plurality of means,
wherein the still picture information to be recorded in said information recording means includes still picture information transferred to said plurality of displays at a timing when it is transferred to said plurality of displays and still picture information displayed on said displays when a capture instruction is given, among the pieces of said transferred still picture information.

40. A network information processing system comprising:
at least one information processor having an input operation function and processing arbitrary information;
a plurality of displays for displaying images based on at least information transferred from said information processor;
an information processing assisting apparatus for assisting network information processing including display processing in said display based on an input operation instruction from said information processor;
communication means for connecting said information processing assisting apparatus and said information processor to each other;
a moving picture/audio input apparatus for inputting an image and audio other than information that is transferred from said information processor; and
an information creating apparatus for recording information transferred from said information processor and said moving picture/audio input apparatus in accordance with an instruction from said information processor and reorganizing this information as contents communicated via a network,
wherein said information creating apparatus includes:
information recording means for recording each of moving picture/audio information from said moving picture/audio input apparatus and still picture information from said plurality of displays;
reproduction management list creating means for listing attribute information about multiple pieces of input still picture information;
organizing means for reorganizing said moving picture/audio information and said still picture information with a display pattern in which said plurality of still picture information pieces are displayed on a display screen simultaneously being selected, based on the attribute information from said reproduction management list creating means; and
control means for controlling said plurality of means; and
wherein the still picture information to be recorded in said information recording means includes still picture information transferred to said plurality of displays at a timing when it is transferred to said plurality of displays and still picture information displayed on said displays when a capture instruction is given, among the pieces of said transferred still picture information.

41. The network information processing system according to claim 40, wherein said communication means is of any one of a wire system and a wireless system.

42. The network information processing system according to claim 40, wherein said information processing assisting apparatus and said information creating apparatus are connected to a network.

43. The network information processing system according to claim 40, wherein a capture instruction for said still picture information is given by said information processor.

44. The network information processing system according to claim 40, wherein information reproduced by said information creating apparatus from said moving picture/audio input apparatus and information displayed on said display are transferred and simultaneously displayed on a display surface of said information processor.

* * * * *